United States Patent
Shimotono et al.

(10) Patent No.: US 7,142,385 B2
(45) Date of Patent: Nov. 28, 2006

(54) METHOD, APPARATUS AND PROGRAM STORAGE DEVICE FOR MAGNETIC DISK DRIVE PROTECTION

(75) Inventors: Susumu Shimotono, Kanagawa-Ken (JP); Mitsuru Ogawa, Kanagawa-Ken (JP); Akiyoshi Tanaka, Kanagawa-Ken (JP)

(73) Assignee: Lenovo (Singapore) Ptd. Ltd., Singapore (SG)

( * ) Notice: Subject to any disclaimer, the term of this patent is extended or adjusted under 35 U.S.C. 154(b) by 5 days.

(21) Appl. No.: 11/021,146

(22) Filed: Dec. 23, 2004

(65) Prior Publication Data
US 2005/0141127 A1   Jun. 30, 2005

(30) Foreign Application Priority Data
Dec. 26, 2003   (JP)   ............... 2003-434779

(51) Int. Cl.
G11B 15/04   (2006.01)
(52) U.S. Cl. ....................................................... 360/60
(58) Field of Classification Search ................ 360/60, 360/75, 55, 69, 77.02, 78.04; 73/65.01, 489; 200/61.49
See application file for complete search history.

(56) References Cited

U.S. PATENT DOCUMENTS

| | | | | |
|---|---|---|---|---|
| 5,227,929 A * | 7/1993 | Comerford | ...................... | 360/75 |
| 5,982,573 A * | 11/1999 | Henze | ........................ | 360/75 |
| 6,520,013 B1 * | 2/2003 | Wehrenberg | ................. | 73/489 |
| 6,612,157 B1 * | 9/2003 | Urano et al. | ............... | 73/65.01 |
| 6,768,066 B1 * | 7/2004 | Wehrenberg | ............. | 200/61.49 |
| 6,771,449 B1 * | 8/2004 | Ito et al. | ........................ | 360/75 |
| 2004/0088773 A1 * | 5/2004 | Andrews | ....................... | 2/49.1 |
| 2004/0125493 A1 * | 7/2004 | Shimotono et al. | ........... | 360/75 |
| 2004/0240098 A1 * | 12/2004 | Ito et al. | ........................ | 360/75 |
| 2004/0252401 A1 * | 12/2004 | Abe et al. | ...................... | 360/75 |
| 2005/0088773 A1 * | 4/2005 | Yoshida | ....................... | 360/75 |
| 2005/0099719 A1 * | 5/2005 | Katai et al. | .................... | 360/75 |

FOREIGN PATENT DOCUMENTS

JP   2629548   4/1997

* cited by examiner

*Primary Examiner*—David Hudspeth
*Assistant Examiner*—Fred F. Tzeng
(74) *Attorney, Agent, or Firm*—Chambliss, Bahner & Stophel, P.C.; David W. Lynch

(57) ABSTRACT

A method, apparatus and program storage device for magnetic disk drive protection is provided. A stable position data storage stores stable-state information representing a magnetic disk drive in an operating environment that satisfies a certain condition. An acceleration sensor senses changes in acceleration acting on the magnetic disk drive and a rest-state measuring unit determines whether the magnetic disk drive is in a state of rest based on information acquired by the acceleration sensor. An operating state determination unit, in response to a first determination by the rest-state measuring unit that the magnetic disk drive is in a state of rest, determines when the state of rest corresponds to the stable-state information stored in the stable position data storage, and sets a detection sensitivity to a sign that which indicates an impending shock to the magnetic disk drive based on a result of a second determination. A magnetic head operation controller controls operation of the magnetic disk drive including retraction of a magnetic head based on the detection sensitivity set by the operating state determination unit.

20 Claims, 13 Drawing Sheets

METHOD, APPARATUS AND PROGRAM STORAGE DEVICE FOR MAGNETIC DISK DRIVE PROTECTION

BACKGROUND OF THE INVENTION

1. Field of the Invention

The present invention relates to mechanism for protecting a magnetic disk drive. More particularly, the present invention relates to a mechanism for protecting a magnetic disk from shocks caused by a fall.

2. Description of the Related Art

In portable computers, such as notebook computers, protection of information processors from shocks caused by an accidental fall during carriage or during operation is important due to hard disk drive vulnerability to shocks and vibrations.

A magnetic disk drive reads data by making a magnetic head seek over a rotating magnetic disk. When the magnetic head collides with the magnetic disk due to a shock or vibration, the magnetic disk may be damaged, making part or all of data irrecoverable. By retracting the magnetic head from the magnetic disk, it is possible to improve shock resistance of the magnetic disk drive when a shock or vibration occurs.

Conventional magnetic disk drives are equipped with protection mechanisms including mechanisms having self-diagnostic capabilities including self-monitoring analysis and reporting technology (S.M.A.R.T) that can acquire various information about the magnetic disk drive such as spin-up time, write error, seek speed, and temperature and predict the possibility of failure.

Protective mechanisms that protect magnetic disk drives in information processors from vibrations and shocks involve retracting a magnetic head when it is detected that a computer equipped with a magnetic disk drive is tilted greatly or that a fall has started, based on output from a pressure sensor that detects changes in the weight of the magnetic disk drive. However, conditions for retraction are abstract and not definite. Thus, when a notebook computer is used on one's lap, the possibility cannot be ruled out that the protective mechanism will detect an inclination that actually will not lead to a fall, with the result that the magnetic head will be retracted unnecessarily. In that case, each time the computer tilts, the magnetic head is retracted from the magnetic disk, impairing the usability of the computer. Such protection mechanisms do reload the magnetic head when retracted by mistake.

In order to protect the magnetic disk drive of a computer from shocks caused by a fall, while maintaining the usability of the computer, it is important to retract the magnetic head by reliably detecting signs that indicate an impending shock to the magnetic disk drive, i.e., to control the retraction of the magnetic head based on conditions for retracting magnetic head specified in detail according to situations in which the computer is used or carried.

Regarding possible postures of a user when using a computer, the user may use it on a stable position such as on the desktop or on an unstable position such as on the laptop.

When the computer is used on a stable position such as on the desktop, the computer is hardly vibrated or tilted. In such a situation, the computer could be shocked greatly by a fall if the user drops the computer on the desk. In such a case, both the fall distance and the interval between the time when a vibration or inclination occurs and the time when the computer is shocked are short.

On the other hand, when the computer is used on an unstable position such as on the laptop, the computer is lightly vibrated and tilted frequently. When the computer falls, the fall distance and the interval between the time when a vibration or inclination occurs and the time when the computer is shocked is relatively long.

It is believed that the magnetic disk drive can be protected reliably without impairing its practical usability if retraction conditions for the magnetic head such as sensitivity to a fall or its signs are switched according to the above situations. Thus, it is an object of the present invention to provide an effective and highly practical magnetic disk drive protection mechanism that can closely accommodate usage situations of the computer.

SUMMARY OF THE INVENTION

To overcome the limitations described above, and to overcome other limitations that will become apparent upon reading and understanding the present specification, the present invention discloses a method, apparatus and program storage device for magnetic disk drive protection.

In one embodiment of the invention, a magnetic disk drive protection mechanism is provided. The magnetic disk drive protection mechanism including a stable position data storage for storing stable-state information representing a magnetic disk drive in an operating environment that satisfies a certain condition, an acceleration sensor for sensing changes in acceleration acting on the magnetic disk drive, a rest-state measuring unit for determining whether the magnetic disk drive is in a state of rest based on information acquired by the acceleration sensor, an operating state determination unit for, in response to a first determination by the rest-state measuring unit that the magnetic disk drive is in a state of rest, determining when the state of rest corresponds to the stable-state information stored in the stable position data storage, and for setting detection sensitivity to a sign that indicates an impending shock to the magnetic disk drive based on a result of a second determination, and a magnetic head operation controller for controlling operation of the magnetic disk drive including retraction of a magnetic head based on the detection sensitivity set by the operating state determination unit.

In another embodiment of the present invention, a computer system equipped with a magnetic disk drive is provided. The computer system including a stable position data storage that stores stable-state information that represents that the magnetic disk drive is placed in an operating environment that satisfies a certain condition, an acceleration sensor that senses changes in acceleration acting on the magnetic disk drive, a rest-state measuring unit that determines whether the magnetic disk drive is in a state of rest based on information acquired by the acceleration sensor, an operating state determination unit that, in response to a first determination by the rest-state measuring unit that the magnetic disk drive is in a state of rest, determines whether the state of rest corresponds to stable state stored in the stable position data storage and sets detection sensitivity to a sign that indicates an impending shock to the magnetic disk drive based on a result of a second determination, and a magnetic head operation controller that controls operation of the magnetic disk drive including retraction of a magnetic head based on the detection sensitivity set by the operating state determination unit.

In another embodiment of the invention, a magnetic disk drive control method for controlling a magnetic disk drive in a computer is provided. The method including determining whether the magnetic disk drive is in a state of rest based on information acquired by an acceleration sensor, determining whether a state of rest of the magnetic disk drive corresponds to a stored stable state, setting a detection sensitivity to a sign that indicates an impending shock to the magnetic disk drive based on the determination of whether the state of rest corresponds to the stable state stored in the predetermined storage unit, and retracting a magnetic head if the sign that indicates the impending shock to the magnetic disk drive are detected based on the detection sensitivity.

In another embodiment of the present invention a program storage device readable by a computer system and a program of instructions tangibly embodied on the program storage device and executable by the computer system to perform operations for controlling a magnetic disk drive is provided that includes determining whether the magnetic disk drive is in a state of rest based on information acquired by an acceleration sensor, determining whether a state of rest that the magnetic disk drive is found to be in corresponds to a stable state stored in a predetermined storage unit, setting detection sensitivity to a sign that indicates an impending shock to the magnetic disk drive based on the determination of whether the state of rest that the magnetic disk drive is found to be in corresponds to the stable state stored in a predetermined storage unit, and retracting a magnetic head if the sign that indicates the impending shock to the magnetic disk drive are detected based on the detection sensitivity.

These and various other advantages and features of novelty that characterize the invention are pointed out with particularity in the claims annexed hereto and form a part hereof. However, for a better understanding of the invention, its advantages, and the objects obtained by its use, reference should be made to the drawings that form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention determines whether a magnetic disk drive or a computer equipped with a magnetic disk drive is in a state of rest, determines whether the state of rest corresponds to a stable state that satisfies certain conditions, and sets detection sensitivity to signs that indicate an impending shock to the magnetic disk drive based on a result of the determination. This makes it possible to provide an effective and highly practical magnetic disk drive protection mechanism that can closely accommodate usage situations of the computer.

For example, using consecutive registered stable states for comparison, it is possible to quickly determine whether the current state of rest is brought about by operation in a stable state, while responding flexibly to the stable-state position that is likely to vary subtly according to the use environment. This enables appropriate sensitivity adjustment.

In one example embodiment of the invention, information processors are equipped with a magnetic disk drive used as a storage device that can include portable information processors such as notebook computers or handheld computers. According to the invention, signs that indicate an information processor is likely to fall are sensed, and the magnetic head is retracted from the magnetic disk, thereby improving shock resistance of the magnetic disk when the information processor actually falls causing a shock. Accordingly, the present invention monitors for inclinations, vibrations, and other state changes of the information processor, analyzes them, and detects signs that predict a fall of the information processor. If signs of a fall are detected, the present invention takes a preliminary action in a data transfer process so that the magnetic head can be retracted quickly.

Figure 1:
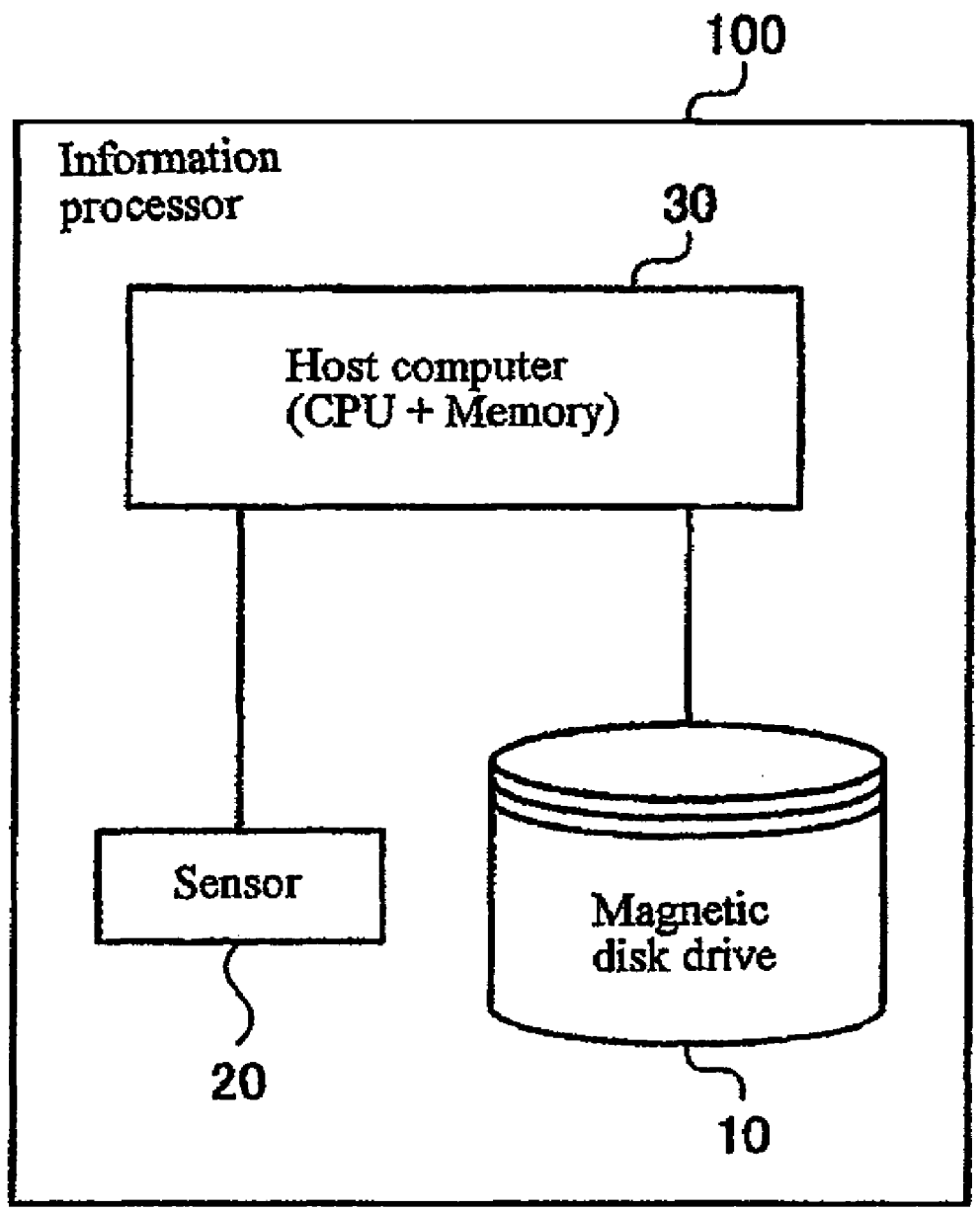
FIG. 1 is a block diagram showing a configuration of an information processor to which a magnetic disk drive protection mechanism according to this embodiment is applied.
Figure 2:
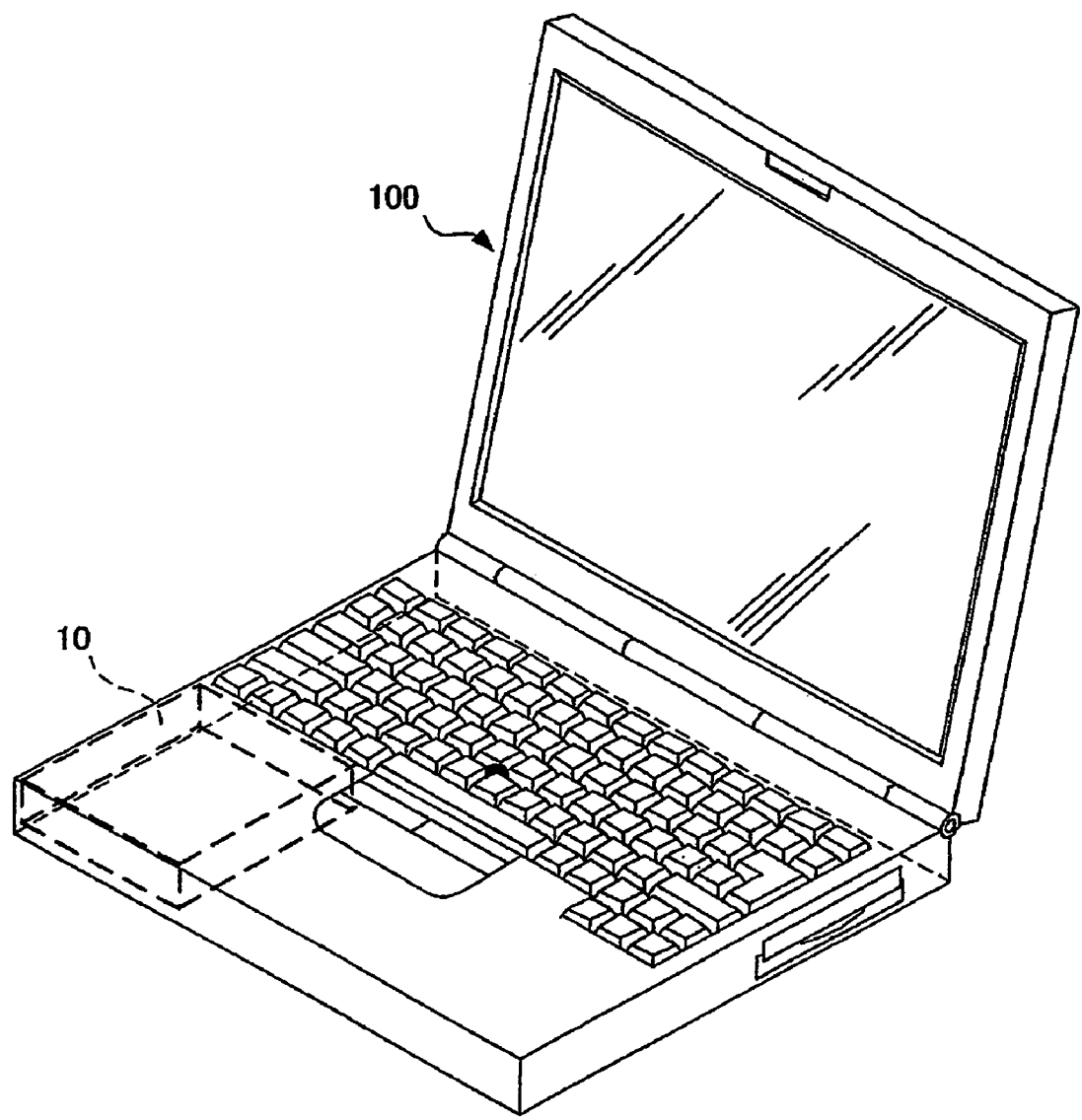
FIG. 2 is a diagram showing an external view of the information processor to which a magnetic disk drive protection mechanism according to this embodiment is applied.

FIG. 1 is a block diagram showing a configuration of an information processor to that a magnetic disk drive protection mechanism is applied in accordance with an embodiment of the invention. As shown in FIG. 1, the information processor 100 includes a magnetic disk drive (HDD) 10 serving as a storage device, a sensor 20 that senses inclinations and vibrations of the information processor, and a host computer (CPU and memory) 30 that controls the magnetic disk drive 10 and sensor 20. As described above, the information processor 100 can be a notebook computer that can be carried easily with the magnetic disk drive 10 mounted in the housing of the computer, as shown in the external view of the information processor in FIG. 2. In this case, the host computer 30 includes a CPU for data processing and a main memory. Because the magnetic disk drive 10 can be tilted, vibrated, and/or shocked together with the computer, the sensor 20 may be installed either in the magnetic disk drive 10 or in the computer housing. Thus, in the following description, it is assumed the information processor 100 can be tilted, vibrated, and/or shocked, but needless to say, it is also true that the magnetic disk drive 10 itself can be tilted, vibrated, and/or shocked, depending on equipment configuration.

Figure 3:
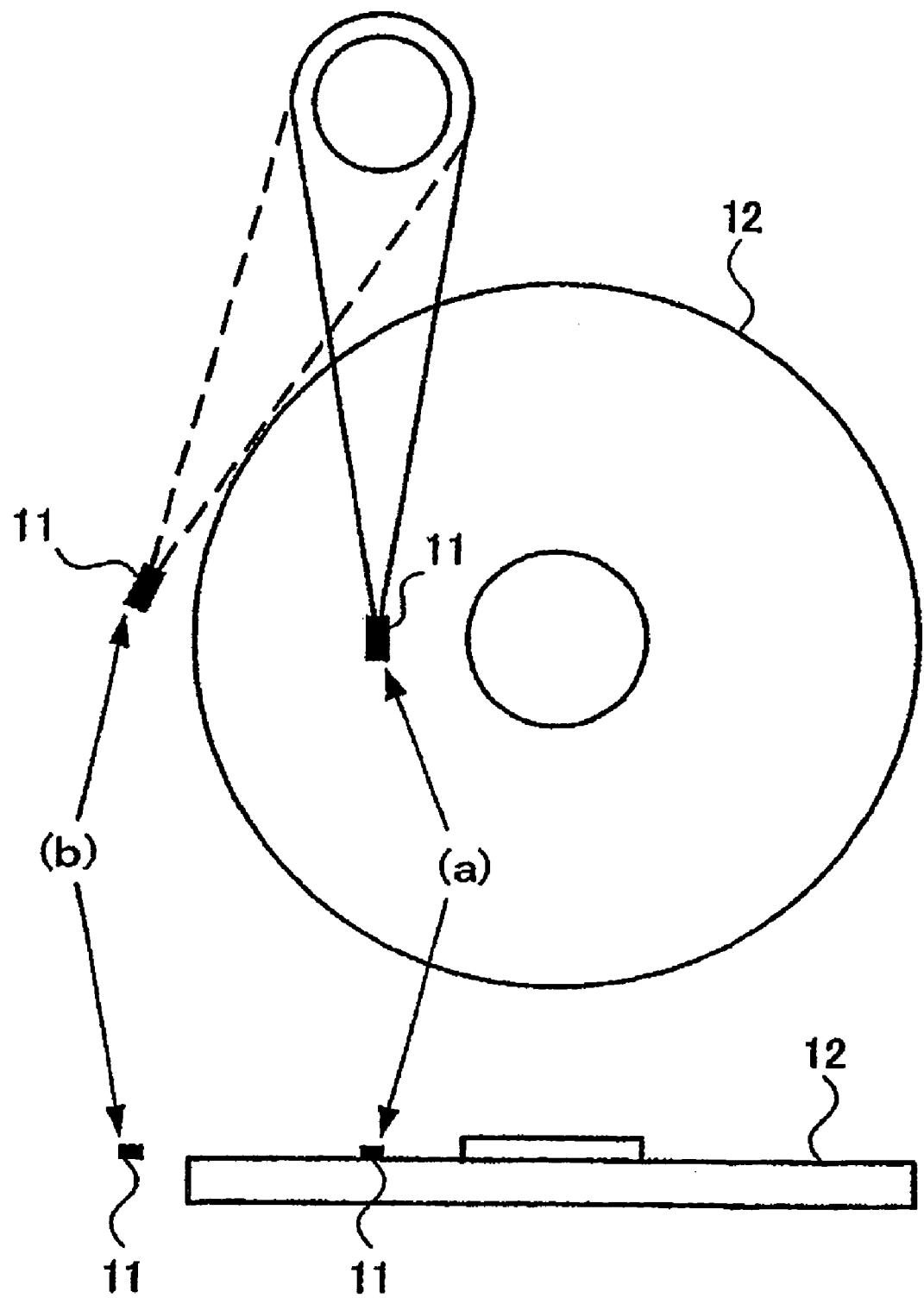
FIG. 3 is a diagram schematically showing a general equipment configuration of a magnetic disk drive.

FIG. 3 is a diagram schematically showing a general equipment configuration of the magnetic disk drive 10, in accordance with an embodiment of the invention. Because of its structure, the magnetic disk drive 10 is more resistant to shocks and vibrations when magnetic head 11(*b*) is located in a predetermined unloaded or retracted position away from a magnetic disk 12 than when the magnetic head 11(*a*) is loaded or located above the magnetic disk 12. Thus, by retracting the magnetic head 11 from the magnetic disk 12 in advance of an impact, it is possible to improve shock resistance of the magnetic disk drive 10 when the information processor 100 is shocked greatly.

The most common case in which the information processor 100 is shocked greatly is when the information processor 100 is dropped from a desktop or laptop on which it is used. Possible measures to protect information processor 100 involve sensing signs predicting a fall of the information processor 100 and retracting the magnetic head 11 from the magnetic disk 12 in response to the predicted fall, thereby protecting the magnetic disk drive 10 before a shock caused by a fall occurs.

Figure 4:
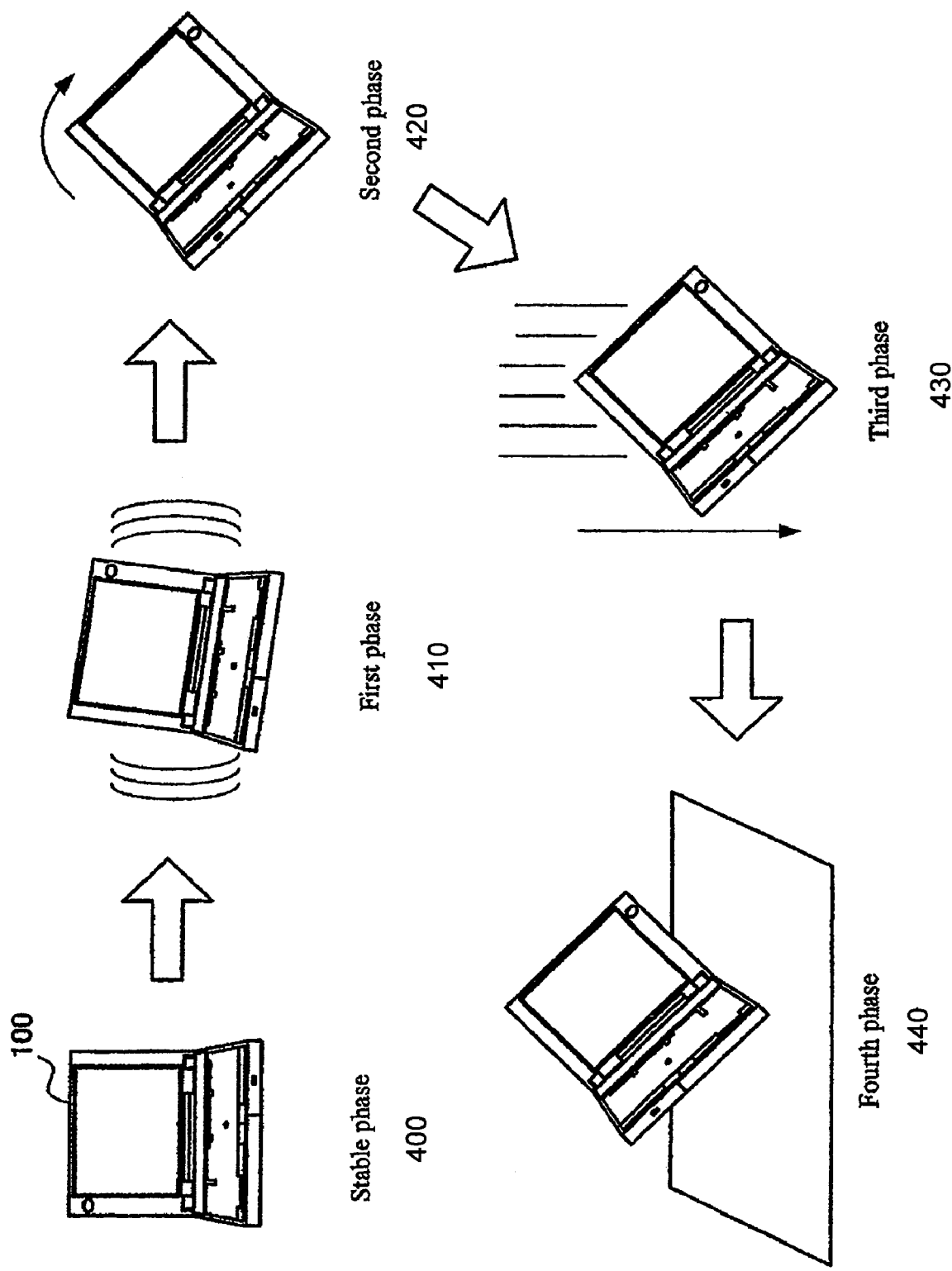
FIG. 4 is a diagram schematically showing state changes beginning with a state of rest and leading to a fall.

FIG. 4 is a diagram schematically showing state changes beginning with a state of rest and leading to a fall. As shown in FIG. 4, the information processor 100 lying in a state of rest 400 on a desk is rocked in the first phase 410 by being picked up by hand. In the second phase 420, as initial motion of the fall, the information processor 100 rocks increasingly and starts to rotate. In the third phase 430, the information processor 100 falls freely and impacts a surface in the fourth phase 440, resulting in a strong shock.

In the above example, since the information processor 100 starts to fall in the second phase, it is preferable to detect transition from the first phase to the second phase quickly and start retracting the magnetic head 11 at an earlier stage. If it is assumed that the information processor 100 is used on the laptop, an average of 20 in (inches) or 50 cm (centimeters) high, it takes approximately 320 msec. (milliseconds) for the information processor 100 to fall from the height of the laptop. Assuming that the initial motion of the fall in the second phase lasts about 150 msec., it takes approximately 470 msec. for a shock to occur when the information processor 100 falls from the laptop.

In the magnetic disk drive 10, it takes approximately 300 msec. for the magnetic head 11 to retract from the magnetic disk 12 in the case of a 2.5-inch hard disk drive (HDD). Thus, there is enough time if the magnetic head 11 is retracted immediately after the start of a fall (transition to the second phase) is detected. With the current state of operation control and data transfer in the magnetic disk drive 10, it is not always possible to start retracting the magnetic head 11 immediately after the start of a fall is detected.

The magnetic disk drive 10 has been standardized to some extent, so it is difficult to add a special mechanism for retracting the magnetic head 11 from the magnetic disk 12 forcibly upon detection of a fall. Consequently, any special design for that will add to the production cost of the magnetic disk drive 10. Thus, it is considered preferable to control retraction of the magnetic head 11 by software using an unload command as is the case with load/unload control of the magnetic head 11.

However, a hard disk controller (HDC) of a typical magnetic disk drive 10 operates in a single-tasking environment and it cannot respond to the host computer 30 while it is performing another operation such as a data write operation. Thus, when an unload command is sent from the host computer 30 to the HDC of the magnetic disk drive 10 to control retraction of the magnetic head 11 by the unload command, and the magnetic disk drive 10 is reading/writing data, execution of the unload command must wait until the read/write operation is complete, resulting in a delayed retraction of magnetic head 11.

Additionally, the magnetic disk drive 10 is generally equipped with a cache memory to temporarily hold write-cache data in the high-speed cache memory before the data is written into the low-speed magnetic disk 12 in order to improve response speed with respect to the host computer 30. Normally, before unloading the magnetic head 11, the write data or dirty data held in the cache memory is written into the magnetic disk 12 and the cache memory is flushed. Thus, if dirty data remains in the cache memory of the magnetic disk drive 10 when an unload command is sent from the host computer 30 to the HDC of the magnetic disk drive 10, execution of the unload command must wait until the cache is flushed, resulting in a delayed retraction of magnetic head 11.

In view of the above, even if it takes approximately 470 msec. for a shock to occur when the information processor 100 falls from the laptop, the approximately 300 msec. it takes for the magnetic head 11 to retract from the magnetic disk 12 is not enough time to protect magnetic disk drive 10. Thus, it is necessary to devise a means of starting to retract the magnetic head 11 immediately upon issuance of an unload command.

As a condition for starting to retract the magnetic head 11, the magnetic disk drive 10 protection mechanism, according to this embodiment, must determine transition from the first phase to second phase shown in FIG. 4 accurately. When the information processor 100 is used on a laptop, it is liable to vibrations and inclinations unlike when it is used on a desktop. If a large inclination of the information processor 100, or a vibration larger than a certain level were used as a condition for starting to retract the magnetic head 11, the protection mechanism might retract the magnetic head 11 by sensing inclinations and vibrations when the operator has changed their position or the position of the information processor 100 during operation. If the magnetic head 11 is retracted in a situation where no fall occurs, data cannot be read or written from/into the magnetic disk drive 10, disabling desired data processing temporarily. Also, if the information processor 100 continues to be tilted or vibrated on the laptop, operation of the magnetic disk drive 10 is not restored, making it impossible to resume data processing. Thus, before retracting the magnetic head 11, it is necessary to analyze inclinations and vibrations of the information processor 100 to ensure that the state of the information processor 100 has changed to the second phase.

As described above, with the magnetic disk drive 10 protection mechanism, it is necessary to ensure before retracting the magnetic head 11 that the state of the information processor 100 changed from the first phase to the second phase shown in FIG. 4 as well as to minimize the interval between the time when an unload command for retracting the magnetic head 11 is issued and the time when the actual retraction occurs.

Figure 5:
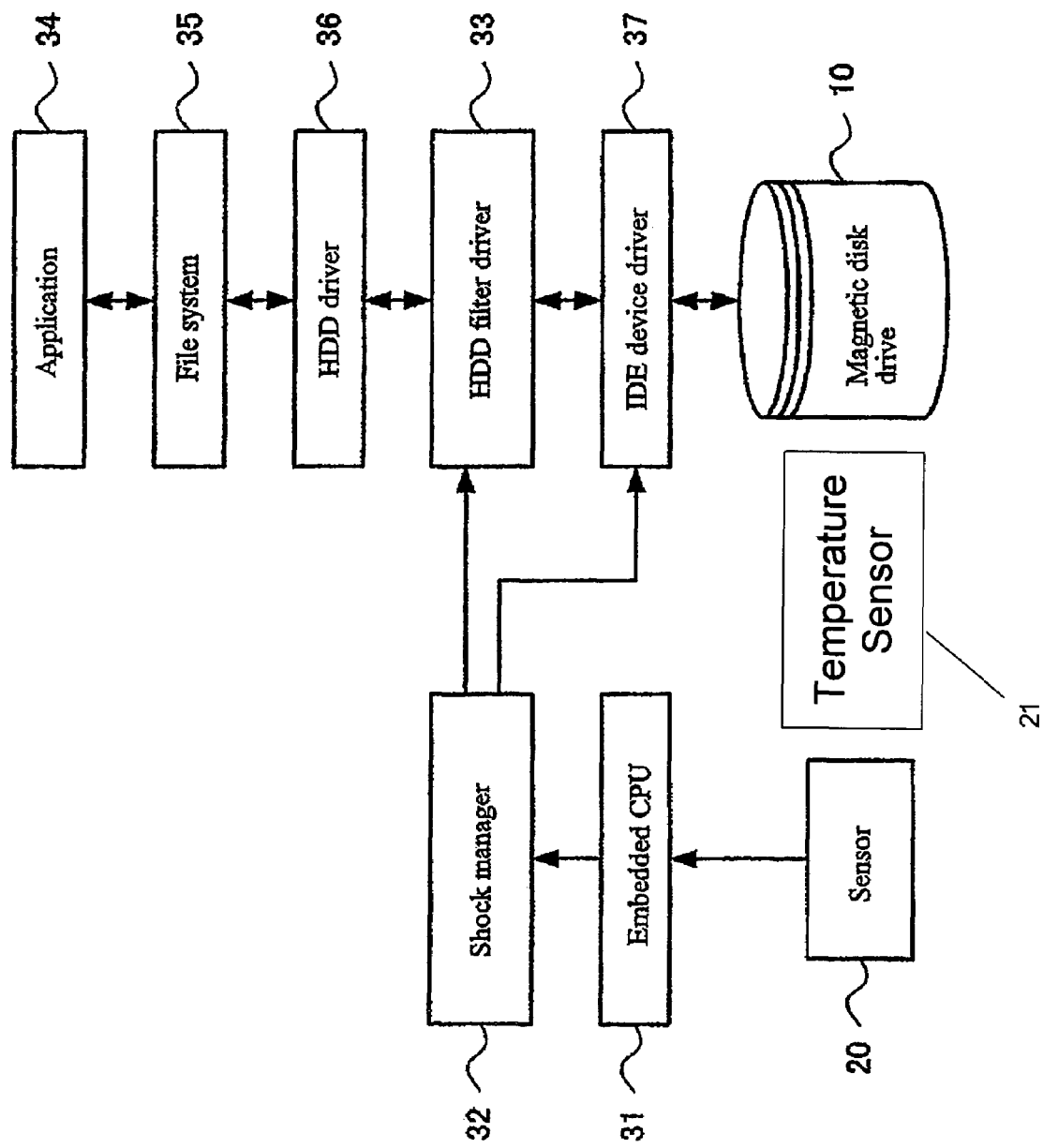
FIG. 5 is a diagram illustrating a system configuration of the magnetic disk drive protection mechanism according to this embodiment.

FIG. 5 is a diagram illustrating a system configuration of the magnetic disk drive 10 protection mechanism in accordance with an embodiment of the invention. Referring to FIG. 5, the embodiment includes a sensor 20 and embedded CPU 31 that serve as information acquiring means for acquiring information about changes in environment including inclinations and vibrations of the information processor 100; a shock manager 32 that serves as analysis means and shock predicting means for analyzing the information acquired by the sensor 20, determining the state of the magnetic disk drive 10, and predicting occurrence of a shock; and an HDD filter driver 33 that serves as control means for controlling the operation of the magnetic disk drive 10 based on the result of determination made by the shock manager 32.

Functions of the embedded CPU 31, shock manager 32, and HDD filter driver 33 are implemented by the program-controlled CPU on the host computer 30. A program on the CPU for performing the above functions is stored on a magnetic disk, optical disk, semiconductor memory, or other recording medium, or is delivered via networks, for example. The program is stored in the magnetic disc unit 10, is read into the memory in the host computer 30, is executed by the CPU, and thereby implements the functions of the components shown in FIG. 2.

As common functions, the host computer 30 further includes applications 34 that perform various specific processes, a file system 35 provided by an operating system (OS), a HDD driver 36 that actually controls the operation of the magnetic disk drive 10, and an IDE device driver 37 that controls connection with the magnetic disk drive 10. These common functions of the host computer 30 are implemented by the program-controlled CPU. Normally, the applications 34 access data files on the magnetic disk drive 10 via the file system 35 provided by the OS. The file system 35 manages the way data files are arranged and stored on the magnetic disk drive 10. File systems can make disk fragmentation transparent to the applications 34, thereby simplifying the use of the magnetic disk drive 10 by the applications 34. The magnetic disk drive 10 is actually accessed by the HDD driver 36 and IDE device driver 37.

The HDD driver 36 that controls the operation of the magnetic disk drive 10 connects to the magnetic disk drive 10 via a driver compatible with an interface, such as integrated drive electronics (IDE) or small computer system interface (SCSI), via which the magnetic disk drive 10 is connected to the host computer. According to this embodiment, it is assumed that the magnetic disk drive 10 uses an IDE interface and that the IDE device driver 37 is used. Under the control of the file system 35, the HDD driver 36 and IDE device driver 37 access an I/O controller (e.g., IDE controller) connected with the magnetic disk drive 10. They operate an I/O port of the I/O controller so that the magnetic disk drive 10 can transfer data at high speed on instructions from the file system 35.

In the above configuration, the embedded CPU 31 acquires information about the state of the information processor 100 from the sensor 20. According to this embodiment, the sensor 20 is an acceleration sensor (accelerometer) that senses changes in accelerations acting on two axes (X and Y axes) or three axes (X, Y, and Z axes) and produces analog output. It is assumed that a three-axis acceleration sensor is used in this embodiment. An acceleration sensor is an inertial sensor that measures linear acceleration or angular acceleration. In general, an accelerometer often means a linear accelerometer such as a gyroscope (angular speedometers). The present invention can be implemented using either of the sensors.

Acceleration information outputted from the sensor 20 at different points of time is sampled by the embedded CPU 31 periodically (e.g., at a sampling frequency of 200 Hz) and is outputted after being converted into digital data. The acceleration information outputted from the sensor 20 includes a static acceleration (gravitational acceleration) varying depending on the position of the sensor 20 (i.e., the position of the housing of the magnetic disk drive 10 or information processor 100 to which the sensor 20 is secured) and dynamic acceleration caused by external forces (shocks) acting on the housing of the magnetic disk drive 10 or information processor 100. Generally, a synthetic value of these accelerations is outputted from the sensor 20.

The shock manager 32 analyzes the acceleration information and time of occurrence (time intervals) acquired by the embedded CPU 31 and calculates the inclination of the housing of the information processor 100 (or magnetic disk drive 10) as well as speed and acceleration of its movement and rotation. The calculated values are accumulated in the shock manager 32 as the most recent change history for a certain period.

Also, the shock manager 32 constantly monitors the current conditions (inclination as well as speed and acceleration of movement and rotation) of the housing of the information processor 100 and determines whether an excessive shock will be caused by a fall in the near future (shock prediction), based on the current conditions and the history.

Furthermore, a temperature sensor 21 to measure temperature near the sensor 20 can be installed to aid in processes described below in FIG. 7.

Figure 6:
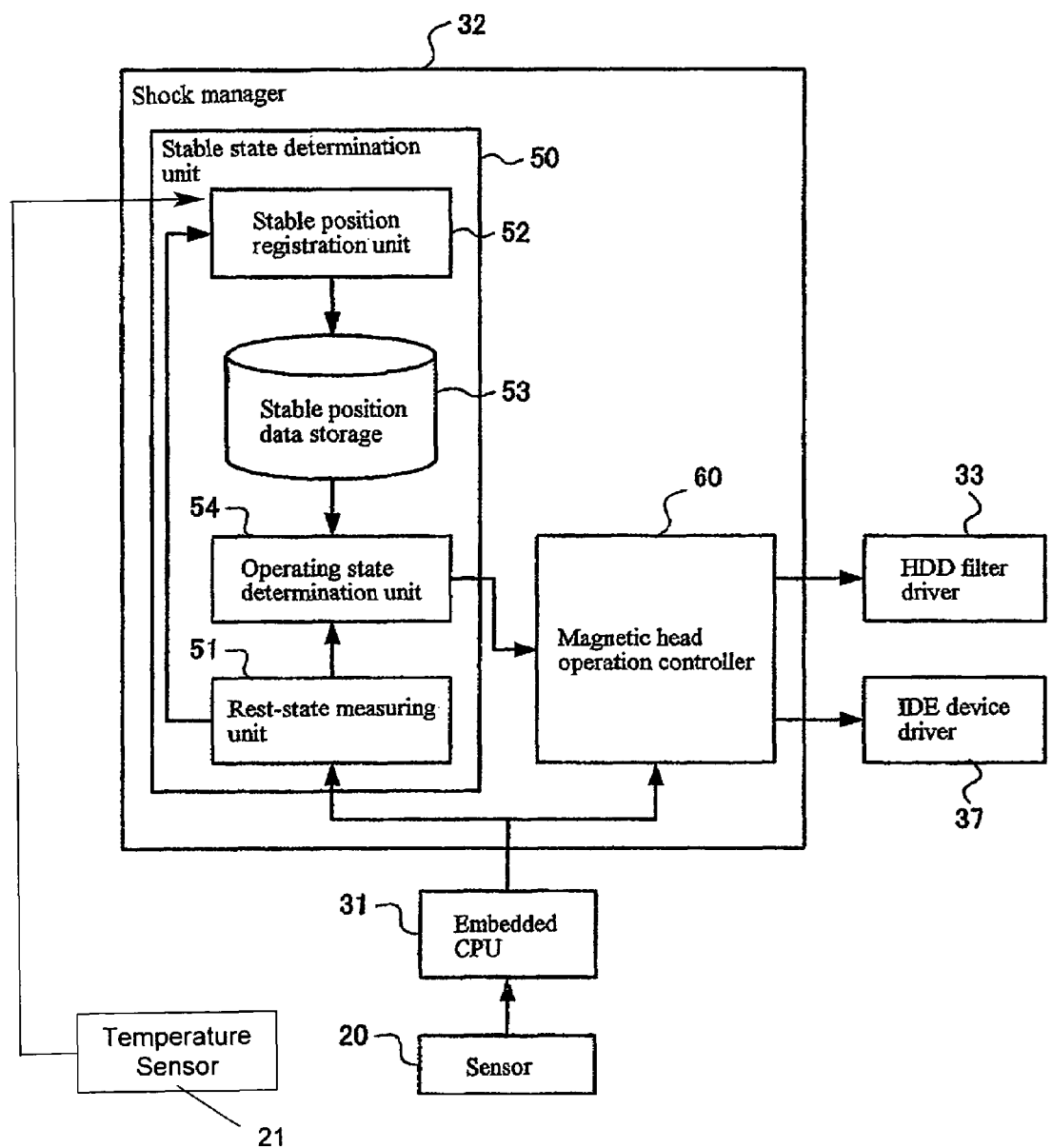
FIG. 6 is a diagram showing a functional configuration of a shock manager according to this embodiment.

FIG. 6 is a diagram showing a functional configuration of the shock manager 32 in accordance with an embodiment of the invention. As shown in FIG. 6, the shock manager 32 includes a stable state determination unit 50 that determines whether the information processor 100 is in a stable state, and a magnetic head operation controller 60 that retracts the magnetic head 11 from the magnetic disk 12 based on the determination made by the stable state determination unit 50 and the acceleration information obtained from the sensor 20 via the embedded CPU 31.

The stable state determination unit 50 includes a rest-state measuring unit 51 that determines, based on the acceleration information obtained from the sensor 20 via the embedded CPU 31, whether the information processor 100 is in a state of rest free of vibrations or rocks, and a stable position registration unit 52 and a stable position data storage 53 that provide criteria for a stable state, an operating state determination unit 54 that determines whether the information processor 100 is operating in a stable state.

In the above configuration, the rest-state measuring unit 51 receives the acceleration information from the sensor 20 via the embedded CPU 31 and determines whether there are changes in the acceleration acting on the information processor 100. If there is no acceleration change, the rest-state measuring unit 51 measures the duration of that period. In addition, the rest-state measuring unit 51 passes the received acceleration information to the stable position registration unit 52.

The stable position registration unit 52 registers a position in which the information processor 100 is placed in as a stable state position. The position of the information processor 100 is registered as a stable position not only when the information processor 100 is placed on a horizontal place such as a desktop, but also when the information processor 100 is placed at a specific angle under certain conditions. For example, when a notebook information processor 100 is connected to a port replicator or docking station, or is placed at user's choice on a somewhat tilted table where it is used, although the information processor 100 is not horizontal in the strict sense, it is as stable as when it is placed on a horizontal place such as a desktop. Thus, this state is also registered as a stable position. Additionally, stable position registration unit 52 can be communicatively coupled to a temperature sensor 21 located near sensor 20 to add a temperature variable in registering stable state positions. Details of stable positions and their registration will be described later. Information about the registered stable positions is stored in the stable position data storage 53 implemented by the memory in the host computer 30.

The operating state determination unit 54 determines whether the information processor 100 is in a stable state, based on the information about the acceleration changes measured by the rest-state measuring unit 51 and the information about the registered stable positions stored in the stable position data storage 53.

This embodiment predicts shocks of falls by monitoring usual position changes of the information processor 100. To minimize the possibility that a shock will occur before the measure is completed, it is considered preferable to catch preliminary slight movements as early as possible by reducing an allowable range of changes such as vibrations and inclinations in the monitoring performed by the shock manager 32.

However, such a setting will cause the magnetic disk drive 10 protection mechanism to respond too sensitively to acceleration changes that occur frequently during normal operation. This presents a new problem of impaired usability. To solve this dilemma, the following idea is suggested. The information processor 100 can be placed on a stable position such as on the desktop could be shocked greatly by a fall if the user drops it on the desk surface. In that case, the fall distance is often short (about 10 to 15 cm).

On the other hand, the information processor 100 could be shocked by a fall if the user drops it while using it on the laptop or while carrying it. In that case, the fall distance is relatively long. An initial operation before the drop has occurred takes a relatively long time in losing the balance until the drop, for example.

Regarding the use environment of the information processor 100, the information processor 100 placed on a desktop is in a very stable condition and is rarely vibrated or tilted greatly except when it is picked up, which may result in a fall. Therefore, there is no significant problem in the use of the information processor 100 even if detection sensitivity to signs of a fall is increased to make it easier for the magnetic head 11 to retract. This state will be referred to as a stable state.

In contrast, the information processor 100 used on a laptop or other unstable place is subject to small position changes. Therefore, it is necessary to decrease the detection sensitivity to signs of a fall to prevent the magnetic head 11 from retracting too easily. In this case, since the fall distance is relatively long and the information processor 100 gets off balance greatly before the fall starts, retraction of the magnetic head 11 can be completed before a shock is caused by the fall. This state will be referred to as an unstable state.

Considering the characteristics of falls in different usage situations of the information processor 100, it is reasonable to establish a basic rule that prescribes that the detection sensitivity to signs of a fall should be increased when the information processor 100 is used in a stable state on the desktop and that the detection sensitivity to signs of a fall should be decreased when the information processor 100 is used in an unstable state on the laptop and to create several usage modes of the information processor 100 by providing several sub-states between the stable state and unstable state. This embodiment uses an algorithm that attaches importance to usability by increasing the detection sensitivity to positional changes with increasing stability with smaller positional changes by decreasing the detection sensitivity to positional changes with decreasing positional stability.

By providing several sub-states between the stable state and unstable state, the present embodiment changes the detection sensitivity to signs of a fall according to the state of the information processor 100. The detection sensitivity of the operating state determination unit 54 detects changes in acceleration information about the sensor 20 observed by the rest-state measuring unit 51 in order to detect signs of a fall.

Figure 7:
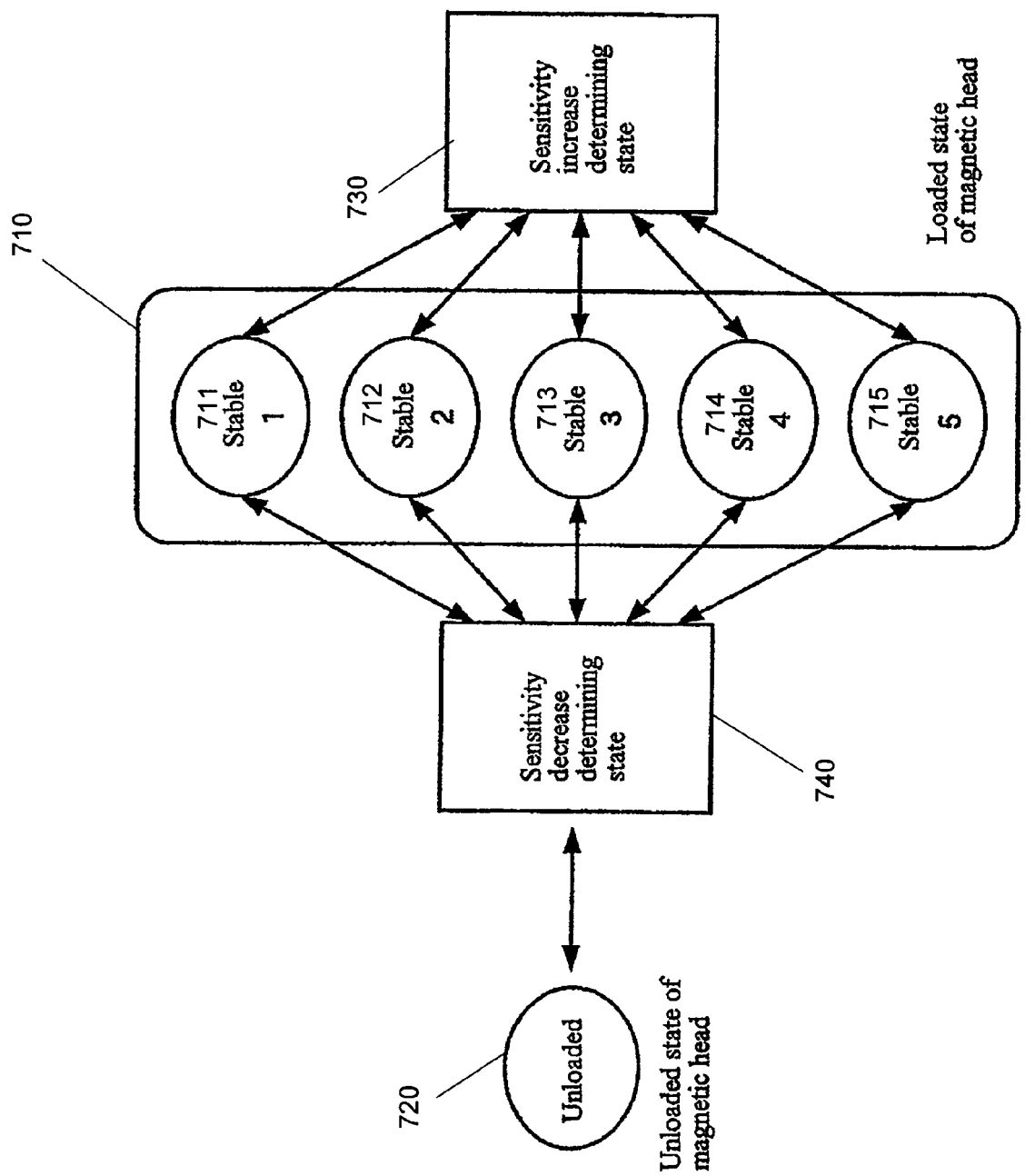
FIG. 7 is a diagram showing state transition in the internal state of the magnetic disk drive protection mechanism according to this embodiment.

FIG. 7 is a diagram showing state transition in the internal state (including detection sensitivity) of the magnetic disk drive 10 protection mechanism according to an embodiment of the invention, where the magnetic disk drive 10 protection mechanism controls the detection sensitivity to signs of a fall by changing it according to the state of the information processor 100. As shown in FIG. 7, in determining an internal state, the operating state determination unit 54 according to this embodiment uses a loaded state 710 and unloaded state 720 of the magnetic head 11 as well as two transitional states (sensitivity increase determining state 730 and sensitivity decrease determining state 740), where the transitional states are used in determining a target state of state transition to decide between the loaded state and unloaded state or decide on a sub-state of the loaded or unloaded state based on the most recent positional change history.

The loaded state 710 is divided into five sub-states: Stable 1 to Stable 5 711–715, respectively. Each of the Stable X sub-state (X=1 to 5) is assigned a unique allowable range of acceleration changes by the rest-state measuring unit 51. If the observed acceleration changes are within the allowable range of acceleration changes specified for a given Stable X sub-state, the magnetic disk drive 10 can remain in this Stable X sub-state.

The allowable range of acceleration changes is set to increase with increases in the sub-state number X of the Stable X sub-state, and if large vibrations occurs frequently, the state changes gradually decreases in sensitivity from Stable 1 to Stable 5.

When the allowable range of acceleration changes for sensitivity is not exceeded for the current Stable X sub-state for a certain period, referred to as a stable period, the state changes from Stable 5 715 to Stable 1 711, thereby decreasing sensitivity state as described later.

A large allowable range of acceleration changes means an accordingly low sensitivity and is suitable for a usage mode in which the information processor 100 is used in an unstable position with a high possibility of small positional changes.

When acceleration changes fall outside the allowable rage of changes for the state (Stable X sub-state) in which the magnetic disk drive 10 is placed at that time, the magnetic head 11 starts unloading based on shock prediction, and the operating state determination unit 54 moves to an unloaded state 720, thereby undergoing a state of decreasing sensitivity.

In the unloaded state 720, conditions for the next return to a loaded state 710 vary depending on what sub-state of a loaded state the magnetic disk drive 10 has just transitioned from, e.g., 711–715. Conditions include, for example, the allowable range of acceleration changes and the minimum stable period required for the given allowable range of acceleration changes. Before transition to an unloaded state 720, information about the last sub-state is registered in the memory of the host computer 30 when going through a sensitivity decrease determining state. This information is reflected within the same unloaded state as a difference in the conditions for reloading.

In an unloaded state 720, if acceleration changes fall outside the appropriate allowable rage of acceleration changes and the duration of the changes satisfies specified conditions, the magnetic head 11 is operated and the operating state determination unit 54 returns to a sub-state of one of the loaded states 711–715 having decreasing sensitivity. Regarding a criterion for selection of the sub-state, it is conceivable to return to the same sub-state as before or transition to a Stable X sub-state with a lower sensitivity depending on the maximum acceleration variation that exceeds the allowable rage of acceleration changes and which is saved during the transition to the unloaded state. However, when returning from an unloaded state 720, there is no need to return to a sub-state with state of lower sensitivity than the previous sub-state. This is in line with the basic rule that the sensitivity should be decreased when the information processor 100 becomes unstable.

On the other hand, there can be transition between sub-states of a loaded state 710. This means gradual transition to higher sub-states with continued positional stability. This is also in line with the basic rule. For example, in the Stable 5 sub-state 715, if it is determined that the range of acceleration changes observed by the rest-state measuring unit 51 falls within the allowable range of acceleration changes for sensitivity increase specified uniquely for the Stable 5 sub-state for the stable period specified (i.e., the acceleration remains stable within a certain range of changes for a relatively long period), the operating state determination unit 54 transitions to a sub-state with a higher sensitivity, e.g. Stable 4 sub-state 714, via a sensitivity increase determining state. Regarding a method for transition among sub-states, it is possible to use a combination of a method that involves transitioning to higher sub-states one by one and a method that involves jumping to a higher sub-state skipping some sub-states when an extremely stable position in comparison to the allowable range of changes is observed continuously.

Basic operation of the stable state determination unit 50 according to this embodiment is divided into a registration phase in which the stable position registration unit 52 registers stable positions in the stable position data storage 53 and a comparison/verification phase in which the operating state determination unit 54 determines whether the information processor 100 is in a stable state based on observation results produced by the rest-state measuring unit 51.

In the registration phase, the stable position registration unit 52 registers the static acceleration (gravitational acceleration, i.e., tilt) of the current positional level remaining in a stable state, and the total duration of the stable state as registered stable-position data in the stable position data storage 53 implemented by a non-volatile memory (e.g., a registry managed by the OS). The stable state can be defined, and the static accelerations that satisfy the definition can be registered.

For example, a state of rest should continue at least for 15 minutes where the allowable range of changes=1.5 degrees (peak-to-peak), keyboard or mouse input should occur within the first five minutes of this period. Without input, the duration of the state of rest after the 5 minutes is not included in the 15 minutes. The LCD panel should never be closed during the period of 15 minutes. When the LCD panel is closed, the duration should be counted from 0 when the LCD panel is opened the next time.

However, there are some restrictions on registration: an positional level is treated as having already been registered and is no longer registered if its acceleration in each axial direction falls within (e.g., within ±0.75 degrees) that of a positional level already registered as a registered stable position.

The number of registered stable states is 32 at the maximum, for example. When the maximum number of 32 is exceeded, the registered stable position with the shortest stable period is replaced by the new registration. Even if the stable position to be newly registered has a duration of 15 minutes, it takes precedence over the old registered stable position that has a longer duration. When the current position is no longer in a stable state, the duration of the current stable state becomes definite and information about the total duration of the stable position last registered is updated. For ease of access for replacement of registered stable positions, information about the order of the stable position last registered among the 32 items of registered data is stored in the memory in the host computer 30. It is also possible to add an option of deleting old data by attaching the time of occurrence of stable state to the registered data. Then, if the owner of the information processor 100 changes, and the information processor 100 is no longer used in stable positions registered during its use by the previous owner, the registered stable positions for the current user can be deleted.

As described above, a temperature sensor 21 to measure temperature near the sensor 20 can be installed. The temperature sensor would measure temperature information used in registering stable positions. For example, a normally registered stable position would not be registered if there is a temperature difference above a certain level.

Figure 8:
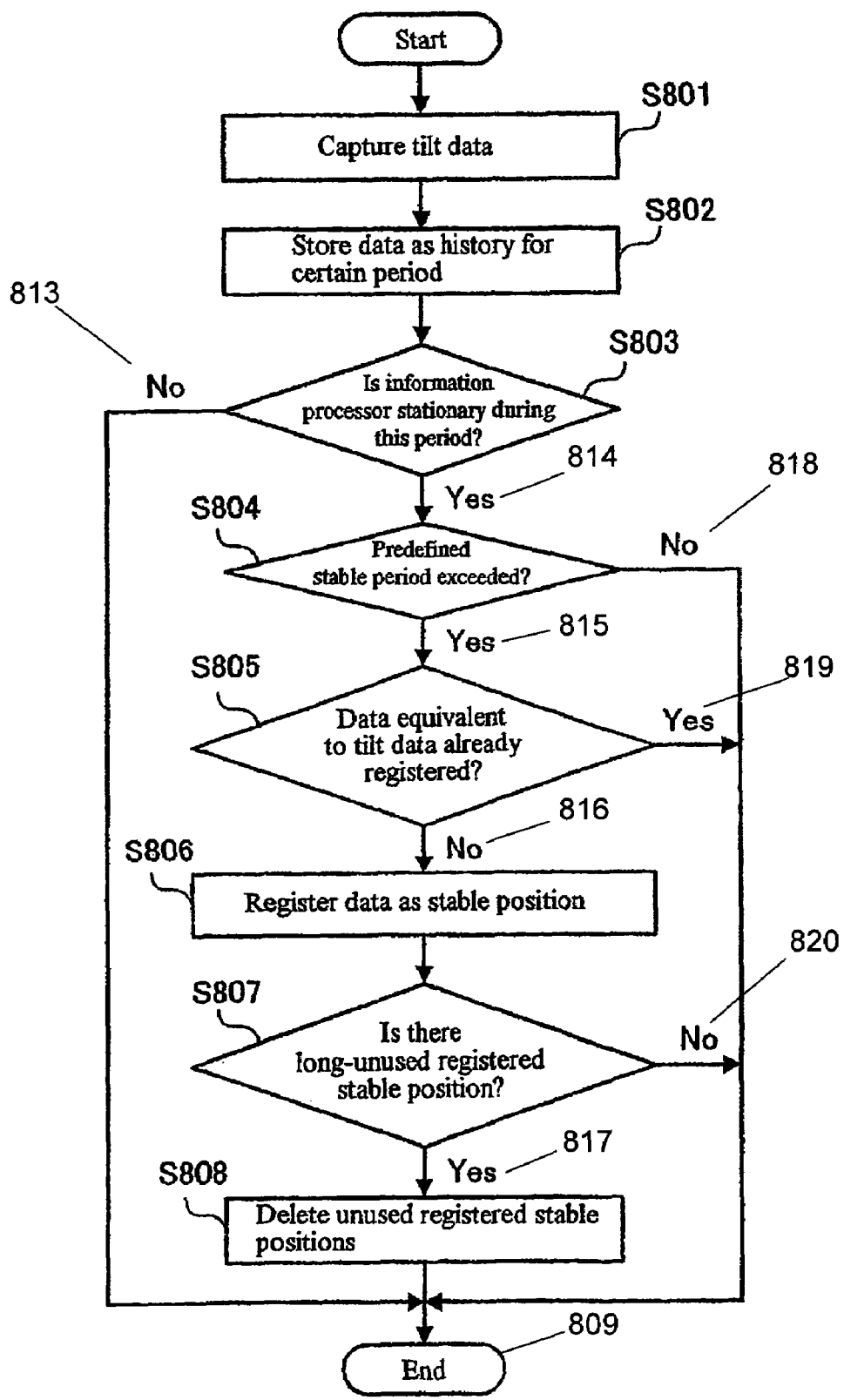
FIG. 8 is a flowchart illustrating operation of a stable state determination unit in a registration phase.

FIG. 8 is a flowchart illustrating operation of the stable state determination unit 50 in the registration phase in accordance with an embodiment of the invention. As shown in FIG. 8, the rest-state measuring unit 51 of the stable state determination unit 50 captures acceleration information about the sensor 20 as tilt data 801 on the position of the information processor 100. Historical data is stored 802 for a certain period in the memory in the host computer 30. Based on the history of the inclination data, the rest-state measuring unit 51 determines 803 whether the information processor 100 is stationary. If the information processor 100 is not stationary 813, its state is not registered as a stable position and the stable state determination unit 50 finishes processing 809.

On the other hand, if it is determined that the information processor 100 is stationary 814, the inclination data is sent to the operating state determination unit 54 and the stable position registration unit 52 determines 804 whether the current state continues for a predefined stable period (15 minutes in the above example) or longer. If the current state continues for the predefined stable period or longer 815, the stable position registration unit 52 checks 805 whether data equivalent to inclination data of the current state has been registered as a registered stable position in the stable position data storage 53. If no appropriate registered stable position is found 816, the stable position registration unit 52 registers 806 the inclination data and related information (time information and temperature information) as a registered stable position. Then, the stable position registration unit 52 checks 807 whether there is data on registered stable positions that has been inactive for a long duration (e.g., a few months). Any data found 817 is deleted 808 by stable position registration unit 52.

If it is determined 804 that the state of rest is shorter than the stable period 818, or if it is determined 805 that equivalent stable position data has been registered 819, or if it is determined 807 that there is no data on registered stable positions that has not been used for a long time 820, the stable state determination unit 50 finishes processing.

In the comparison/verification phase, if a state of rest continues for a certain short period (e.g., for 8 seconds with the allowable range of changes being 1.5 degrees (peak-to-peak as is the case with the above example in which state of rest continues for 15 minutes), the operating state determination unit 54 compares the static acceleration (including temperature if temperature information is taken into consideration) and the data on the stable positions registered in the registration phase. For example, it checks whether the current state of rest coincides with a registered stable position using the same conditions as those used above to compare a new registration level with an existing registration level. If the same or very similar registered stable position is found, the operating state determination unit 54 determines that the current position is in the stable state and uses the highest sensitivity as the detection sensitivity to signs of a fall.

On the other hand, if no registered stable position is found, the operating state determination unit 54 determines that the current state of rest is temporary and that the state of rest continues accidentally for a short period in an unstable positional state and refrains from carelessly applying a high detection sensitivity. This means refraining from transition from the current sub-state to a sub-state with a higher sensitivity even if conditions for sensitivity increase are satisfied in the sensitivity increase determining state in the state transition described with reference to FIG. 7.

Specifically, if the current position in a state of rest does not correspond to a registered stable position in view of externally observed acceleration changes, the state transition to a sub-state with a higher sensitivity is prohibited. For example, only transition between two sub-states—Stable 5 and Stable 4—is allowed and transition to a higher sub-state is prohibited. This makes it possible to avoid inadvertent retraction of magnetic head in positions that correspond to unstable states.

Figure 9:
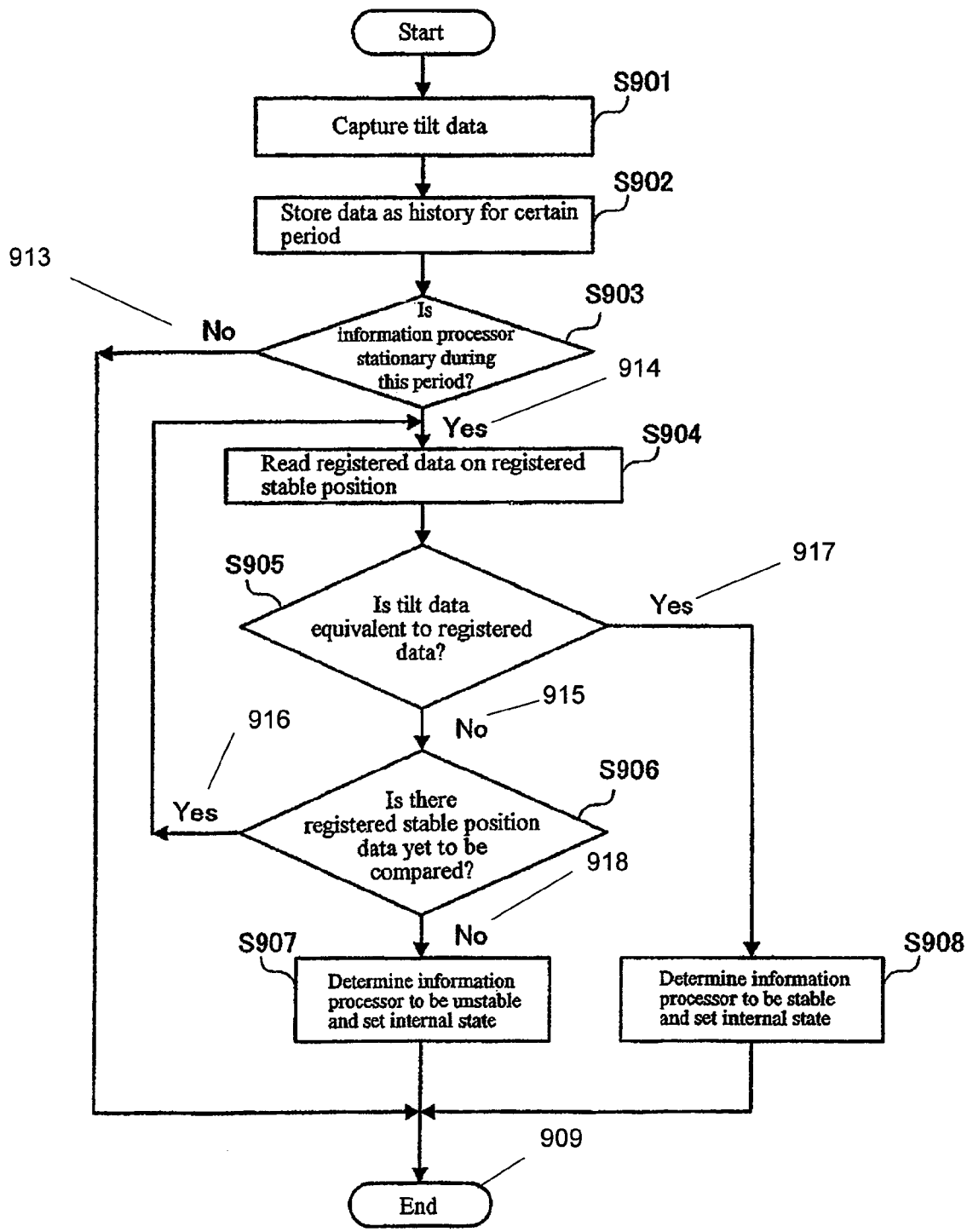
FIG. 9 is a flowchart illustrating operation of the stable state determination unit in a comparison/verification phase.

FIG. 9 is a flowchart illustrating operation of the stable state determination unit 50 in the comparison/verification phase. As shown in FIG. 9, the rest-state measuring unit 51 of the stable state determination unit 50 captures 901 acceleration information about the sensor 20 as tilt data on the position of the information processor 100. The data is stored 902 as a history for a certain period in the memory in the host computer 30. Then, based on the history of the inclination data, the rest-state measuring unit 51 determines 903 whether the information processor 100 is stationary. If the information processor 100 is not stationary 913, there is no need for comparison/verification of its state and the stable state determination unit 50 finishes processing 909.

On the other hand, if it is determined that the information processor 100 is stationary, the inclination data is sent to the operating state determination unit 54 and the operating state determination unit 54 reads 904 data on one registered stable position from the stable position data storage 53 and compares 905 it with the inclination data. If the inclination data from the rest-state measuring unit 51 is not equivalent to the data on the registered stable position 915, the operating state determination unit 54 checks 906 whether there is data on registered stable positions yet to be compared. If there is still data yet to be compared 916, the operating state determination unit 54 returns read 904 registered data on the next registered stable position.

If a determination 905 is made that the inclination data from the rest-state measuring unit 51 is equivalent to the data on the registered stable position 917, the operating state determination unit 54 determines 908 that the information processor 100 is operating in a stable state and sets the internal state such that signs of a fall will be detected with an appropriate detection sensitivity. At this time, the internal state transitions as described above if necessary.

On the other hand, if it is determined 906 that no data on registered stable positions is equivalent to the inclination data acquired from the rest-state measuring unit 51 918, the operating state determination unit 54 determines 907 that the information processor 100 is operating in an unstable state and sets the internal state such that signs of a fall will be detected with an appropriate detection sensitivity.

The internal state settings thus decided are passed to the magnetic head operation controller 60 and used to control the sensitivity for actual detection of signs of a fall.

Incidentally, the operations in the registration phase and comparison/verification phase are independent of each other and can be performed in separate cycles. In that case, the operation in the comparison/verification phase, which is intended to control the detection sensitivity to signs of a fall according to the state of the information processor 100, is preferably performed on a short cycle (e.g., on the order of 20 msec.). On the other hand, the operation in the registration phase, which is intended to detect and register a stable state of the information processor 100, may be performed on a relatively long cycle (e.g., on the order of 100 msec. to a few seconds).

Incidentally, although according to this embodiment, the position of the information processor 100 in use is monitored based on acceleration information about the sensor 20 and the position is determined to be in a stable state and registered dynamically if certain conditions are satisfied, predetermined fixed values may be registered in advance. In that case, such values are acquired and registered during assembly at the factory. Generally, in the case of acceleration sensors (tilt sensors), it is not possible to set fixed values uniformly in advance because of individual differences, and thus reference acceleration (inclination data obtained as static gravitational acceleration in conceivable stable positions, in this case) is measured and registered at the factory.

As described above, according to this embodiment, if the position of the information processor 100 remains in a state of rest for a certain period, the inclination of the housing of the information processor 100 at that time is measured and the resulting data is compared with data on stable positions registered in advance. Through this comparison, it is determined whether the information processor 100 is operating in a position equivalent to a known stable state. If it is operating in a stable state, the detection sensitivity to signs of a fall is increased. In other words, the detection sensitivity to signs of a fall is set at a level higher than the current level. Otherwise, the sensitivity is decreased.

This makes it possible to prevent the protection mechanism from malfunctioning in response to minute changes intrinsic to operation in an unstable position. This is based on the assumption that even if the same inclination as in a stable position available on a desktop is produced accidentally on a laptop, this state rarely continues for a long period.

Figure 10:
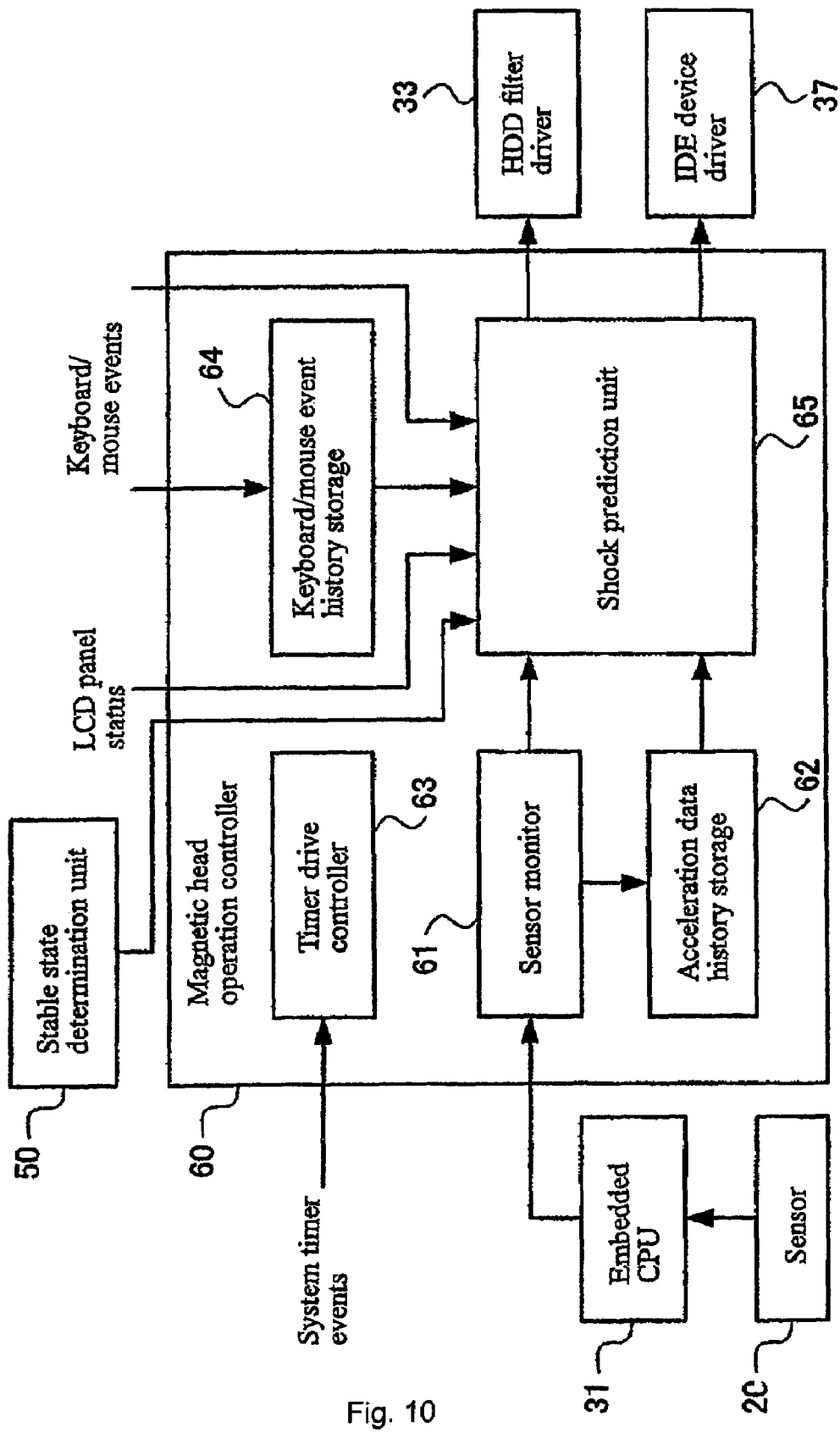
FIG. 10 is a diagram showing a configuration of a magnetic head operation controller according to this embodiment.

FIG. 10 is a diagram showing a configuration of the magnetic head operation controller 60 according to this embodiment. Referring to FIG. 10, the magnetic head operation controller 60 is a timer-driven module that is driven periodically by a system timer. It includes a sensor monitor 61, acceleration data history storage 62, timer drive controller 63, keyboard/mouse event history storage 64, and shock prediction unit 65. Also, as shown in FIG. 10, internal state settings made by the operating state determination unit 54 of the stable state determination unit 50 are inputted in the shock prediction unit 65.

The sensor monitor 61 acquires the acceleration levels of any or all of the three axes (X, Y, and Z) from the sensor 20 each time it is driven based on the system timer. The acquired acceleration level information (acceleration data) is used for shock prediction. Shock predictions may be made with respect to the acceleration level given as a synthetic vector of the three axes or the acceleration levels of the three axes treated separately. In the latter case, however, the acceleration levels of the three axes are ANDed when no danger is expected or the acceleration levels of the three axes are ORed when a danger is expected.

The acceleration data acquired by the sensor monitor 61 is sent to the shock prediction unit 65 and acceleration data history storage 62. The acceleration data history storage 62 stores a history of acceleration sample data for a sufficiently long period compared to the time taken by a fall, which is a major cause of shocks occurring in normal operation. For example, if acceleration data corresponding to a history for 5 minutes is sampled at 100 Hz, the number of samples is 500 (=100×5) per axis.

The timer drive controller 63 adjusts an actual driving period of the module driven periodically by the system timer. For example, when the information processor 100 is in a highly unstable state and is highly likely to be shocked significantly by a fall, the module is driven at 100 Hz, but when the information processor 100 is in a stable state (hereinafter referred to as a normal mode), in which there is no need to monitor the information processor 100 frequently, the monitoring and relevant calculation are performed at 25 Hz. In this way, by adjusting the actual driving period adaptively according to the state of the information processor 100, it is possible to reduce the load required by the host computer 30 to determine the state of the information processor 100 and detect a fall.

The keyboard/mouse event history storage 64 records a predetermined time (e.g., the past 5 seconds as is the case with the history of acceleration data) of keyboard and mouse events that can be acquired as normal system evens.

Status of the LCD panel (display device) of the information processor 100 is represented by the panel's open/closed state if the LCD panel can be opened and closed as in the case of a notebook computer. It is acquired directly by the shock prediction unit 65 to determine usage status of the information processor 100. For example, if changes in acceleration value is detected based on the acceleration data acquired by the sensor monitor 61, if the LCD panel remains open, it can be determined that the information processor 100 is being used in an unstable state. On the other hand, if the LCD panel remains closed, it can be determined that the information processor 100 is being carried. In the latter case, there is a high possibility that the information processor 100 will be dropped by mistake, and a criterion (threshold Th) for the shock prediction made by the shock prediction unit 65 can be lowered (described later) so that the magnetic head 11 will be retracted by responding to changes in the state of the information processor 100 with high sensitivity.

Similarly, in addition to being stored in the keyboard/mouse event history storage 64, events resulting from keyboard and mouse operations are acquired directly by the shock prediction unit 65 and used together with history information from the keyboard/mouse event history storage 64 to determine the usage status of the information processor 100. For example, if input operations are performed via keyboard or mouse before the information processor 100 is dropped, it can be determined that the information processor 100 is dropped while being used by the user on the laptop or other unstable place. On the other hand, if no input operation is performed for some period before the information processor 100 is dropped, it can be determined that the information processor 100 was dropped by being picked up first and then dropped. Results of these situation assessments can be used as conditions for retraction of the magnetic head 11 as appropriate. Once the magnetic head 11 is retracted, it can be returned when user interaction such as an input operation via keyboard or mouse is resumed.

By using the presence or absence of input operations, the density of operations (amount of input per unit time), or an input pattern to adjust the criterion (threshold Th) for shock prediction, it is possible to make the retraction conditions of the magnetic head 11 more consistent with the user's current usage pattern.

Specifically, if there are predetermined keyboard or mouse operations for a certain period, detected acceleration changes may not be unintentional on the part of the user making it likely that the user has control of the computer and can take an action quickly to prevent a fall even when signs of a fall are indicated. Thus, when there are such input operations, it is possible to increase the threshold Th over its usual level, thereby decreasing the sensitivity to changes in the state of the information processor 100, and thereby preventing the magnetic head 11 from retracting too sensitively in response to acceleration changes during operation. Furthermore, by taking into consideration the density of operations or input patterns in the adjustment of the threshold Th, it is possible to ensure that the threshold Th will not be adjusted even if input operations are detected unless a density of operations higher than a certain level is detected during a certain period from the present back to the past.

Also, when adjusting the threshold Th, it is also possible to determine whether the user is operating the mouse intentionally by checking whether or not the mouse cursor is drawing a monotonous and linear trajectory, by whether or not the mouse cursor is moving faster than usual, or by whether or not double-clicking is used. When trying to hold the information processor 100 to prevent its fall, the user may touch the mouse unintentionally, thereby entering an input via the mouse. The selective utilization of mouse input helps avoid mistaking such an unintentional input for the user's international input operation in normal use. Similarly, in the case of keyboard input, it is possible to check whether input operations are performed intentionally by the user, based on whether proper typing intervals are observed in a series of inputs.

Except the timer drive controller 63, all the modules described above are capable of communicating with the shock prediction unit 65 and provide information needed by the shock prediction unit 65 to generate a magnetic head 11 retraction request or magnetic head 11 return request and an operation mode switch notice (described later) sent to the HDD filter driver 33.

Figure 11:
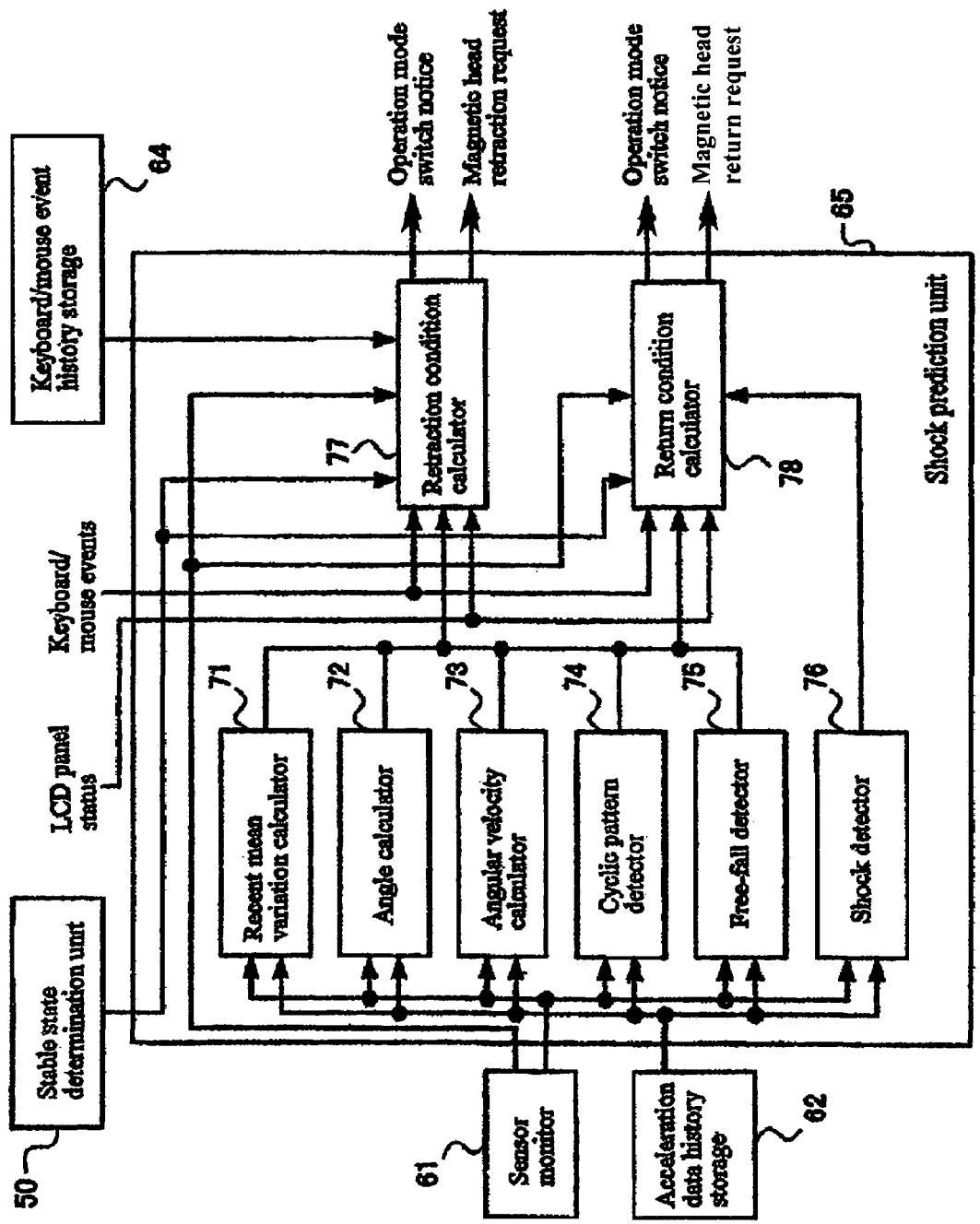
FIG. 11 is a diagram illustrating internal functions of the shock prediction unit in FIG. 10 in more detail.

FIG. 11 is a diagram illustrating internal functions of the shock prediction unit 65 in more detail. Referring to FIG. 11, the shock prediction unit 65 includes recent mean variation calculator 71, angle calculator 72, angular velocity calculator 73, cyclic pattern detector 74, free-fall detector 75, shock detector 76, retraction condition calculator 77, and return condition calculator 78.

As shown in FIG. 11, the internal state settings made by the operating state determination unit 54 of the stable state determination unit 50 are inputted in the retraction condition calculator 77 of the shock prediction unit 65. Based on these settings, the retraction condition calculator 77 adaptively changes sensitivity used in making a shock prediction in relation to newly generated accelerations.

The recent mean variation calculator 71 calculates the mean value of accelerations (absolute values) obtained during a predetermined immediately preceding period, or the mean value of integrals (velocities) of the accelerations per unit time using information from the acceleration data history storage 62. Alternatively, based on the mean value of accelerations or velocities, it is also possible to calculate predetermined statistical quantities equivalent to them. Possible statistical quantities include, for example, a weighted average with weights placed on the side nearer to the present along the time axis, an average over a period excluding those periods that contain values falling outside a predetermined range and the standard deviation of variations during a given period.

The calculated values are used for adaptation of return conditions of the magnetic head 11. Specifically, after the magnetic head 11 is retracted because of a predicted shock, and no excessive shock is detected, and it is determined that the magnetic disk drive 10 is in a stable state (it remains in a state of rest or in a comparable state of positional changes for a certain period), a magnetic head 11 return request is made to the HDD filter driver 33 to return the magnetic head 11. Decision criteria (return conditions) are then adaptively adjusted based on a state that existed before a shock is expected to occur, i.e., based on a history of the changes in the inclination and dynamic acceleration outputted from the sensor 20 for a certain period. For example, if there is a relatively wide range of variation for a certain period before the magnetic head 11 is retracted, it is considered that the information processor 100 has been used in an environment (on a laptop) prone to some positional changes from the beginning and adjustments are made to return the magnetic head 11 based on easy return conditions (even if there are some positional changes).

The angle calculator 72 keeps track of changes in the inclination of the information processor 100. Specifically, the current inclination is determined by comparing the current gravitational acceleration with the static gravitational acceleration determined in advance with the information processor 100 placed horizontally. If the current inclination exceeds a certain angle, it is more likely that this angle was produced immediately after the start of a fall (a state immediately after transition to the second phase in FIG. 4) than during the use of the information processor 100. Thus, when such an angle change occurs, it is used in combination with calculation results produced by the angular velocity calculator 73, described later, to determine whether a shock will occur. The acceleration values obtained from the sensor 20 are often a synthesis of dynamic acceleration and static acceleration making it necessary to extract static acceleration by removing changes on the frequency axis, with exception to a low range using a low-pass filter.

The angular velocity calculator 73 performs calculations used in shock prediction in conjunction with angle changes calculated by the angle calculator 72 as described above. That is, only when the information processor 100 has an inclination greater than a certain angle having a certain angular velocity, it is determined that a shock will occur. This does not necessarily mean that a shock is predicted only when an angle change above a certain level is calculated. It is possible to adaptively set allowable limits of angular velocity at different angles and predict a shock when a relatively large angular velocity is detected even if there is a small inclination (angle change). One method for determining angular velocity involves using angular displacement measured with a linear accelerometer every unit time as mean angular velocity.

The cyclic pattern detector 74 monitors change patterns of particular acceleration or change patterns of numeric values (e.g., velocities) calculated based on the acceleration. This makes it possible to predict a shock when acceleration changes that alone will not lead to a prediction of a shock occur with a particular pattern. Specific examples include an acceleration change pattern detected when the user operates the information processor 100 while walking or a characteristic acceleration change pattern detected when the information processor 100 slips off the laptop without significant rotational motion.

The free-fall detector 75 detects sudden discontinuous changes in gravitational acceleration and determines that the information processor 100 has started a free fall. If the information processor 100 starts a free fall, a consequent shock is expected.

The shock detector 76 detects any significant shock caused to the information processor 100 by an actual fall. Also, it provides the return condition calculator 78 with the information needed to determine whether to consider return conditions after an actual shock or whether to return the magnetic head 11 quickly because the decision made by the retraction condition calculator 77 as to retraction of the magnetic head 11 was a mistake.

The retraction condition calculator 77 receives the internal state settings made by the operating state determination unit 54 of the stable state determination unit 50 as well as information produced by the modules other than the shock detector 76 and determines, considering the above information comprehensively, whether the information processor 100 is in an unstable state (the first phase in FIG. 4) or the magnetic head 11 should be retracted quickly because of an initiated fall (the second phase in FIG. 4). In the latter case, the retraction condition calculator 77 makes a magnetic head 11 return request to the HDD filter driver 33. In the former case, it gives an operation mode switch notice (described later) to the IDE device driver 37 to transition to a high-risk mode.

After the magnetic head 11 is retracted based on the request from the retraction condition calculator 77, the return condition calculator 78 receives information produced by the above modules including the shock detector 76 and determines whether the magnetic head 11 should be returned, considering the above information comprehensively. To return the magnetic head 11, the retraction condition calculator 77 makes a magnetic head 11 return request to the HDD filter driver 33. Also, based on the above determination, the retraction condition calculator 77 gives an operation mode switch notice (described later) to the IDE device driver 37 to transition to the normal mode.

The HDD filter driver 33 is installed between the HDD driver 36 and IDE device driver 37 and issues an unload command for retracting the magnetic head 11 and load command for returning the magnetic head 11 on instructions (a magnetic head 11 retraction request and return request) from the shock manager 32. By controlling access to the magnetic disk drive 10 from the HDD driver 36 and IDE device driver 37, the HDD filter driver 33 makes preparations for retracting the magnetic head 11 quickly in case the information processor 100 falls. Specifically, the HDD filter driver 33 provides two modes of access to the magnetic disk drive 10: a normal mode for use when the information processor 100 is in a stable state and a high-risk mode for use when the information processor 100 is highly likely to be shocked significantly by a fall. It switches between the two modes according to the state of the information processor 100 as determined by the shock manager 32.

In the normal mode, the HDD filter driver 33 does not perform any special operation other than interfacing between the HDD driver 36 and IDE device driver 37. On the other hand, the HDD filter driver 33 adds two operations to the magnetic disk drive 10 access controlled by the file system 35: (1) fragmentation of an access unit and (2) disabling of a write-cache function. The addition of these functions makes it possible to immediately execute an unload command issued by the host computer 30, thereby retracting the magnetic head 11 of the magnetic disk drive 10 from the magnetic disk 12.

In the magnetic disk drive 10, one data file recorded on the magnetic disk 12 normally consists of contiguous variable-length blocks (data blocks) whose size is an integral multiple of a sector that is a recording unit of the magnetic disk drive 10 or a cluster that is the smallest recording unit.

As described earlier, a typical magnetic disk drive 10 cannot respond to the host computer 30 during a data write process. As a result, even if the shock manager 32 detects the start of a fall of the information processor 100 and the host computer 30 sends an unload command to the magnetic disk drive 10, it is not possible to execute the unload command and retract the magnetic head 11 until the ongoing process is finished. Thus, when the data file to be accessed contains large data blocks (extending over a large number of sectors and clusters), it may take a long time until the unload command is executed. In addition, the formatting operation of magnetic disk 12 is lengthy making the magnetic disk drive 10 unavailable for a long period of time.

To avoid such a situation, when an access to a data block requested by the file system 35 is expected to take a long time because of its relatively large size, the HDD filter driver 33 divides the data block (large block) into smaller blocks, segments the access request to the data block into access requests to the small blocks, and then accesses the magnetic disk drive 10. By making the small blocks conform in size to the sectors or clusters, it is possible to minimize the time required to access the individual small blocks. Since the access request issued by the file system 35 clearly specifies the size of transfer data, destination, etc., it is possible to recognize the size of the data block based on contents of the request and determine whether the access will take a long time. And because the data size for a single access can be reduced, it is possible to keep the period during which the control of the magnetic disk drive 10 is taken up by the access operation below a certain level.

Figure 12:
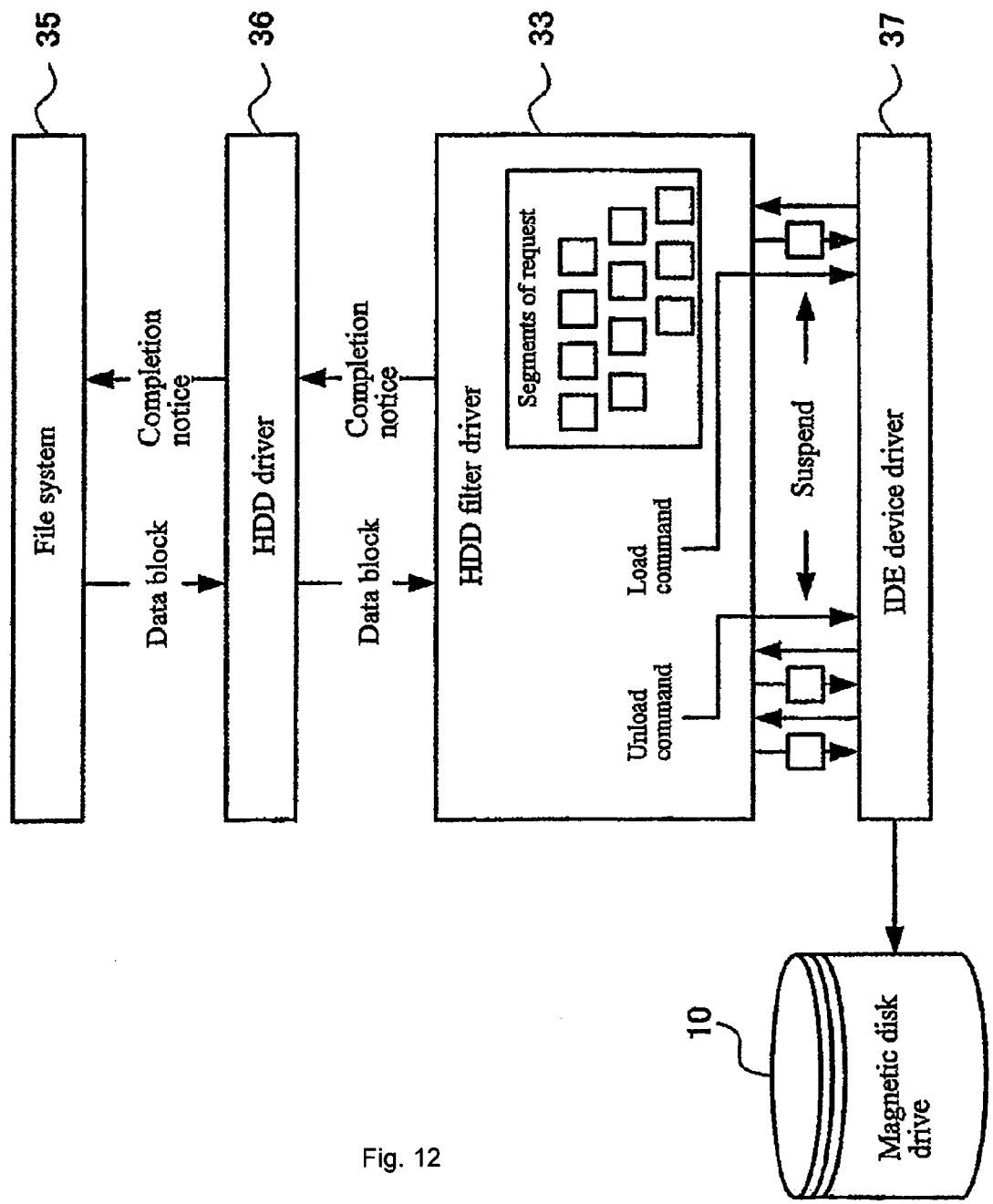
FIG. 12 is a diagram illustrating a concept of fragmentation of an access unit according to this embodiment.

FIG. 12 is a diagram illustrating a concept of the fragmentation of an access unit. As shown in FIG. 12, the HDD filter driver 33 informs the file system 35 about completion of the access to the pre-fragmentation large block once the access to the post-fragmentation small blocks is completed and makes fragmentation transparent to the file system 35.

During fragmentation, if an unload command is issued during access to the large block, the unload command is executed once the ongoing access to a small block is completed. This makes it possible to prevent long durations of the time between the issuance and execution of the unload command.

If the magnetic head 11 is unloaded during access to the large block, any small blocks yet to be processed are accumulated and saved in an internal queue of the HDD filter driver 33. When the magnetic head 11 is unloaded, the data transfer requests for the small blocks are taken out of the internal queue in a FIFO manner and executed subsequently.

As described earlier, the magnetic disk drive 10 is equipped with a cache memory to improve response speed with respect to the host computer 30 and uses write caching during data writing. When the magnetic head 11 is retracted from the magnetic disk 12 by unloading, the cache is flushed and volatile data in the cache memory is transferred to magnetic data (non-volatile data) on the magnetic disk 12 before the unload command is executed. Therefore, even if the shock manager 32 detects the start of a fall of the information processor 100 and the host computer 30 sends an unload command to the magnetic disk drive 10, it may take a long time before the cache is flushed and the unload command is executed.

To avoid such a situation, the HDD filter driver 33 disables the write-cache function of the magnetic disk drive 10. As a result, when an unload command is issued, it can be executed quickly to retract the magnetic head from the magnetic disk 12, without flushing the cache.

Incidentally, when the shock manager 32 determines that the information processor 100 is in a stable state and the HDD filter driver 33 switches the operation mode to normal mode, the write-cache function of the magnetic disk drive 10 is enabled again.

As a variation of the disabling of the write-cache function described above, it is possible to adopt a method that flushes the cache each time dirty data is generated in the cache, thereby creating a state that is virtually equivalent to a state in which the write-cache function is disabled (and no dirty data is accumulated in the cache memory).

If the write-cache function is disabled completely, although the magnetic head 11 can be unloaded quickly, the write cache cannot be used in normal access processing to improve response speed with respect to the host computer 30, and thus the performance is reduced slightly.

Thus, according to this technique, the HDD filter driver 33 does not disable the write-cache function in the high-risk mode. Instead, just after each time data is written into the magnetic disk 12, a cache flush command is sent to the magnetic disk drive 10, and thereby the dirty data produced in the cache memory by the data write operation is erased. This makes it possible to use the cache memory for data write operations, improving the response speed with respect to the host computer 30. On the other hand, it is possible to create a state in which no dirty data is accumulated in the cache memory except during data write operations, that is, a state virtually equivalent to a state in which there is no write cache.

This means that since access to the magnetic disk drive 10 does not necessarily require a long continuous time, if a cache flush operation is inserted in an idle period of the magnetic disk drive 10 between access operations, it is possible to eliminate dirty data from the cache memory during unloading of the magnetic head 11 in most cases. That is, this offers virtually the same effect as when no write cache exists.

As described above, when the information processor 100 is in an unstable state and is highly likely to be shocked by a fall, the HDD filter driver 33 switches to the high-risk mode, in which the HDD filter driver 33 performs the following two operations for access to the magnetic disk drive 10 by controlling the IDE device driver 37: (1) fragmentation of an access unit and (2) disabling of a write-cache function (including virtual disabling through immediate flushing of the cache). Because the two additional operations are independent of each other and separately reduce the time to execution of unloading, it is possible to perform one or both of the additional operations.

When it is determined by the shock manager 32 that the information processor 100 is highly likely to be shocked significantly by a fall and once the magnetic head 11 is unloaded, even if a new access request to the magnetic disk drive 10 is sent from the file system 35, the HDD filter driver 33 only accepts the access request and there is no access to the magnetic disk drive 10 until the high-risk state is ended. Here, the high-risk state is ended when a shock prediction by the retraction condition calculator 77 and return condition calculator 78 turns out to be a mistake and the information processor 100 is determined to have returned to a stable state because the changes in the housing of the information processor 100 that have led to the prediction are no longer observed, or when a shock occurs as predicted and the information processor 100 remains in a stable state for a period long enough to determine (empirically) that the shock has gone away. The file system 35 makes the next process wait until the access request currently being processed is completed (IO Complete). Thus, until the information processor 100 satisfies the return conditions of the magnetic head 11, any new access request from the file system 35 does not cause the magnetic head 11 to be loaded.

Figure 13:
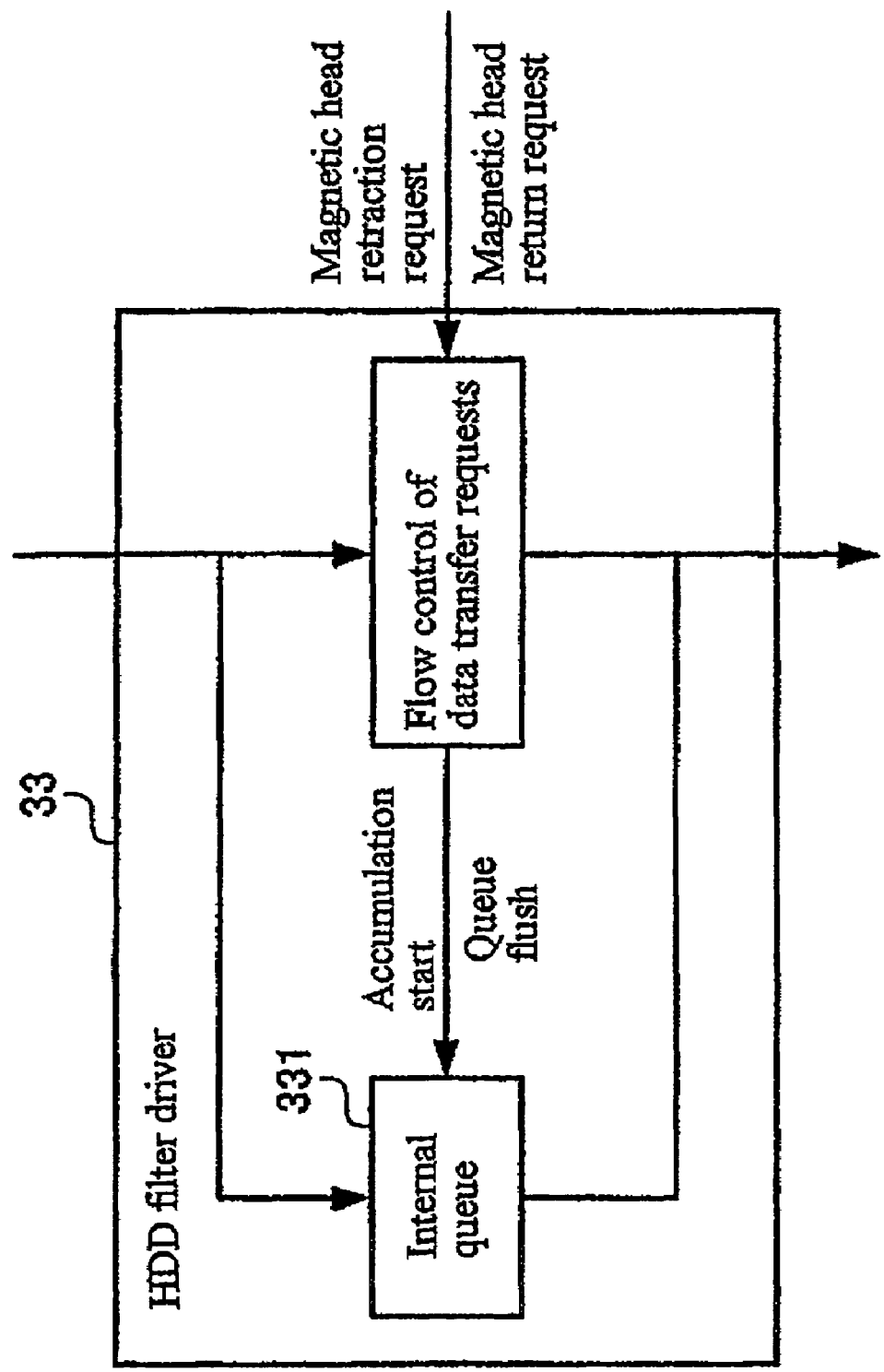
FIG. 13 is a diagram illustrating operation of an HDD filter driver in the case where an access request is accepted while a magnetic head is retracted.

FIG. 13 is a diagram illustrating operation of the HDD filter driver 33 where an access request is accepted while the magnetic head 11 is retracted. It is assumed that the magnetic head 11 has already been retracted and that a data transfer request (access request) is delivered to the HDD filter driver 33 from the file system 35 when neither the information processor 100 remains in a state of rest or in a comparable state of positional changes for a certain period (i.e., in a stable state), nor there is any mouse/keyboard input by user interaction to load the magnetic head 11. In such a case, the data transfer request is placed in the internal queue (data transfer request queue) 331 of the HDD filter driver 33. When return conditions of the magnetic head 11 on the information processor 100 are satisfied, a magnetic head 11 return request is sent from the shock manager 32. Upon receiving the return request, the HDD filter driver 33 removes the data transfer requests from the internal queue (queue flush command) in a FIFO manner and handles newly arrived data transfer requests. Data transfer requests arriving while the internal queue 331 is being flushed are accumulated in the internal queue 331 one after another to deal with such a transitional state. When all the data transfer requests accumulated in the internal queue 331 are removed, normal flow control of data transfer requests is resumed.

The above operations make it possible to prevent a situation in which the magnetic head 11 would return to its original position inadvertently during unloading and collide with the magnetic disk 12 due to a subsequent external shock, damaging the magnetic disk 12 and rendering part or all of the data irrecoverable.

With fragmentation of an access unit, if the magnetic head 11 is unloaded when all segments of an access request have not been processed yet, delivery of the remaining segments of the access request to the IDE device driver 37 is suspended until the retracted magnetic head 11 returns. This again prevents the magnetic head 11 from returning to its original position and thereby damaging the magnetic disk 12.

When return conditions of the magnetic head 11 are satisfied, an operation request (load command) needed to return and load the magnetic head 11 on the magnetic disk 12 is sent from the HDD filter driver 33 to the IDE device driver 37. The magnetic disk drive 10 will not need such an operation request if the magnetic head 11 is loaded automatically with transmission of a normal data processing request. However, if it is desired to reduce or omit the time required to return the magnetic head 11 at the time of next access to data in the magnetic disk drive 10, even if the magnetic head 11 is returned automatically with data access, a return operation request (load command) may be sent regardless of the presence or absence of a data access request when the return conditions of the magnetic head 11 are satisfied.

Incidentally, although in the above embodiment, the HDD driver 36, HDD filter driver 33, and IDE device driver 37 are separate modules, it is also possible to implement a single module that contains all the functions of these drivers.

Also, although in this embodiment, an unload command is used to retract the magnetic head 11 from the magnetic disk 12, it is also possible to use a power saving command (stand-by command) that stops the magnetic disk 12 together with a spindle motor in the case of magnetic disk drives 10 of a specification that does not have special-purpose command for unloading the magnetic head 11.

The operation control method for the magnetic disk according to the above embodiment may also be implemented as programs running on the host computer 30 of the information processor 100, especially as programs that make the host computer 30 execute processes shown in FIGS. 8 and 9.

The programs may be provided to the computer, for example, having been installed on the information processor 100 or stored on a recording medium in a format readable by the host computer 30. The recording medium may be an optical disk such as a DVD or CD-ROM (Compact Disc Read Only Memory), magnetic disk, semiconductor memory. Also, the programs may be provided, for example, via a network.

Although the above embodiments have been described citing information processor 100 as a notebook computer, it is also applicable to single-unit magnetic disk drives, hard disk recorders, and various other devices equipped with a magnetic disk drive serving as storage means.

When viewed as an invention relating to a recording medium such as those listed above, the present invention provides a recording medium storing a program in a format readable by a computer, wherein the program makes the computer execute the processes of determining whether the magnetic disk drive is in a state of rest based on acceleration information acquired by an acceleration sensor; determining whether a state of rest that the magnetic disk drive is found to be in corresponds to stable state stored in a predetermined storage unit and setting detection sensitivity to signs that indicate an impending shock to the magnetic disk drive based on a result of the determination; and retracting a magnetic head if signs that indicate an impending shock to the magnetic disk drive are detected based on the detection sensitivity.

The foregoing description of the exemplary embodiment of the invention has been presented for the purposes of illustration and description. It is not intended to be exhaustive or to limit the invention to the precise form disclosed.

Many modifications and variations are possible in light of the above teaching. It is intended that the scope of the invention be limited not with this detailed description, but rather by the claims appended hereto.

What is claimed is:

1. A magnetic disk drive protection mechanism, comprising:
    a stable position data storage for storing stable-state information representing a magnetic disk drive in an operating environment that satisfies a certain condition;
    an acceleration sensor for sensing changes in acceleration acting on the magnetic disk drive;
    a rest-state measuring unit for determining whether the magnetic disk drive is in a state of rest based on information acquired by the acceleration sensor;
    an operating state determination unit for, in response to a first determination by the rest-state measuring unit that the magnetic disk drive is in a state of rest, determining whether the state of rest corresponds to the stable-state information stored in the stable position data storage, and for setting detection sensitivity to a sign that indicates an impending shock to the magnetic disk drive based on a result of a second determination; and
    a magnetic head operation controller for controlling operation of the magnetic disk drive including retraction of a magnetic head based on the detection sensitivity set by the operating state determination unit.

2. The magnetic disk drive protection mechanism of claim 1, wherein the stable position data storage stores information about acceleration in a state when there is no acceleration change for more than a certain period.

3. The magnetic disk drive protection mechanism of claim 1, further comprising a stable position registration unit for determining a state of rest as a stable state and for storing information about acceleration during the state of rest in the stable position data storage when the rest-state measuring unit determines that the magnetic disk drive is in the state of rest and the state of rest satisfies certain conditions.

4. The magnetic disk drive protection mechanism of claim 3, further comprising a temperature sensor proximate to the acceleration sensor, and communicatively coupled to the stable position registration unit, wherein the stable position registration unit stores the data temperature during the state of rest determined to be the stable state as information about the stable state.

5. The magnetic disk drive protection mechanism of claim 1, wherein, when the state of rest of the magnetic disk drive corresponds to a stable state stored in the stable position data storage, the operating state determination unit sets the detection sensitivity to the sign at a level higher than the current level.

6. The magnetic disk drive protection mechanism according to claim 1, wherein, when the magnetic head is once retracted by the magnetic head operation controller and then returned, the operating state determination unit sets the detection sensitivity to the sign at a level lower than the current level.

7. The magnetic disk drive protection mechanism according to claim 1, wherein, when the state of rest of the magnetic disk drive does not correspond to any stable state stored in the stable position data storage, the operating state determination unit keeps the detection sensitivity to the sign from rising above a certain level.

8. A computer system equipped with a magnetic disk drive, comprising:
    a stable position data storage that stores stable-state information that represents that the magnetic disk drive is placed in an operating environment that satisfies a certain condition;
    an acceleration sensor that senses changes in acceleration acting on the magnetic disk drive;
    a rest-state measuring unit that determines whether the magnetic disk drive is in a state of rest based on information acquired by the acceleration sensor;
    an operating state determination unit that, in response to a first determination by the rest-state measuring unit that the magnetic disk drive is in a state of rest, determines whether the state of rest corresponds to stable state stored in the stable position data storage and sets detection sensitivity to a sign that indicates an impending shock to the magnetic disk drive based on a result of a second determination; and
    a magnetic head operation controller that controls operation of the magnetic disk drive including retraction of a magnetic head based on the detection sensitivity set by the operating state determination unit.

9. The computer system according to claim 8, further comprising a stable position registration unit that determines a state of rest to be a stable state and stores at least information about acceleration during the state of rest in the stable position data storage when the rest-state measuring unit determines that the magnetic disk drive is in the state of rest and there is no acceleration change for more than a certain period.

10. The computer system according to claim 8, wherein, when the state of rest of the magnetic disk drive corresponds to a stable state stored in the stable position data storage, the operating state determination unit sets the detection sensitivity to the sign at a level higher than the current level.

11. The computer system according to claim 8, wherein, when the magnetic head is once retracted by the magnetic head operation controller and then returned, the operating state determination unit sets the detection sensitivity to the sign at a level lower than the current level.

12. The computer system according to claim 8, wherein, when the state of rest of the magnetic disk drive does not correspond to any stable state stored in the stable position data storage, the operating state determination unit keeps the detection sensitivity to the sign from rising above a certain level.

13. A magnetic disk drive control method for controlling a magnetic disk drive in a computer, comprising:
    determining whether the magnetic disk drive is in a state of rest based on information acquired by an acceleration sensor;
    determining whether a state of rest of the magnetic disk drive corresponds to a stored stable state;
    setting a detection sensitivity to a sign that indicates an impending shock to the magnetic disk drive based on the determination of whether the state of rest corresponds to the stable state stored in the predetermined storage unit; and
    retracting a magnetic head if the sign that indicates the impending shock to the magnetic disk drive are detected based on the detection sensitivity.

14. The magnetic disk drive control method according to claim 13, wherein determining the state of rest comprises determining the state of rest to be a stable state with no acceleration change for a period of time.

15. The magnetic disk drive control method according to claim 14, further comprising storing information about the stable state of rest with no acceleration change for a period of time.

16. The magnetic disk drive control method according to claim 13, wherein the setting a detection sensitivity to a signs further comprises, when the state of rest of the magnetic disk drive corresponds to a stable state stored in the stable position data storage, setting the detection sensitivity to a level higher than the current level.

17. The magnetic disk drive control method according to claim 13, wherein the setting a detection sensitivity to a signs further comprises, when the magnetic head is once retracted and then returned, setting the detection sensitivity to a level lower than the current level.

18. The magnetic disk drive control method according to claim 13, wherein the setting a detection sensitivity to a sign further comprises, when the state of rest of the magnetic disk drive does not correspond to any stable state stored in the stable position data storage, the detection sensitivity to the sign is kept from rising above a certain level.

19. A program storage device, comprising:
program instructions embodied upon a computer-readable medium executable by a processing device to perform operations for controlling a magnetic disk drive, the operations comprising:
determining whether the magnetic disk drive is in a state of rest based on information acquired by an acceleration sensor;
determining whether a state of rest that the magnetic disk drive is found to be in corresponds to a stable state stored in a predetermined storage unit;
setting detection sensitivity to a sign that indicates an impending shock to the magnetic disk drive based on the determination of whether the state of rest that magnetic disk drive is found to be in corresponds to the stable state stored in a predetermined storage unit; and
retracting a magnetic head if the sign that indicates the impending shock to the magnetic disk drive are detected based on the detection sensitivity.

20. The computer program product according to claim 19, further comprise determining a state of rest to be a stable state and storing at least information about acceleration during the state of rest in the predetermined storage unit when the magnetic disk drive is in the state of rest and when there is no acceleration change for more than a certain period.

* * * * *